United States Patent
Lewis-Weber et al.

(10) Patent No.: US 12,407,761 B1
(45) Date of Patent: *Sep. 2, 2025

(54) VOICE-AI WARNING SYSTEM FOR PREDICTED EVENTS

(71) Applicant: Assured Insurance Technologies, Inc., Stanford, CA (US)

(72) Inventors: Justin Lewis-Weber, Stanford, CA (US); Theo Patt, Stanford, CA (US)

(73) Assignee: Assured Insurance Technologies, Inc., Stanford, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/193,448

(22) Filed: Apr. 29, 2025

Related U.S. Application Data

(63) Continuation of application No. 18/979,210, filed on Dec. 12, 2024.

(51) Int. Cl.
*G06Q 40/08* (2012.01)
*H04L 67/50* (2022.01)
*H04L 41/16* (2022.01)

(52) U.S. Cl.
CPC ............ *H04L 67/50* (2022.05); *G06Q 40/08* (2013.01); *H04L 41/16* (2013.01)

(58) Field of Classification Search
CPC ......... H04L 41/16; H04L 41/18; H04L 41/20; H04L 41/22; H04L 41/24; G06Q 40/08
See application file for complete search history.

(56) References Cited

U.S. PATENT DOCUMENTS

| | | |
|---|---|---|
| 6,574,561 B2 | 6/2003 | Alexander |
| 10,217,169 B2 | 2/2019 | Schumann, Jr. |
| 10,679,296 B1 | 6/2020 | Devereaux |
| 10,885,587 B1 | 1/2021 | Mendoza |
| 10,997,663 B1 | 5/2021 | Wyatt |
| 11,107,292 B1 | 8/2021 | Little |
| 11,250,515 B1 | 2/2022 | Feiteira |
| 11,315,194 B2 | 4/2022 | Blessman |
| 11,436,648 B1 | 9/2022 | Zahn |
| 11,514,526 B1 | 11/2022 | Kwartler |
| 11,860,944 B2 * | 1/2024 | Lee .................. G06F 16/90332 |

(Continued)

FOREIGN PATENT DOCUMENTS

| | | | | |
|---|---|---|---|---|
| JP | 2025053497 A | * | 4/2025 | |
| KR | 102791661 B1 | * | 4/2025 | ............. G06F 16/65 |

OTHER PUBLICATIONS

Peng Shi, "Assessing Hail Risk for Property Insurers with a Dependent Marked Point Process", Journal of the Royal Statistical Society Series A: Statistics in Society, vol. 185, Issue 1, Jan. 2022, pp. 302-328, Published Oct. 6, 2021.

(Continued)

*Primary Examiner* — Khanh Q Dinh
(74) *Attorney, Agent, or Firm* — Mahamedi IP Law LLP

(57) ABSTRACT

Embodiments include a computing system, computer-implemented method and non-transitory computer readable medium for predicting events and voice-AI warnings. According to embodiments, data corresponding to a predicted event is received, and users that are predicted to be affected by the predicted event are identified. A voice-AI engine is initiated to perform a voice-AI call to the identified users, where the voice-AI call provides a warning to each of the users.

9 Claims, 21 Drawing Sheets

(56) References Cited

U.S. PATENT DOCUMENTS

| | | | |
|---|---|---|---|
| 12,026,782 B2 | 7/2024 | Patt | |
| 12,039,609 B2 | 7/2024 | Patt | |
| 12,079,993 B1* | 9/2024 | Lochner | G16H 30/40 |
| 12,251,242 B1* | 3/2025 | Vakili | G16H 40/67 |
| 12,299,557 B1* | 5/2025 | Ellis | G06N 3/0475 |
| 2009/0286505 A1 | 11/2009 | Kirk | |
| 2011/0137685 A1 | 6/2011 | Tracy | |
| 2014/0132409 A1 | 5/2014 | Billman | |
| 2014/0245165 A1 | 8/2014 | Battcher | |
| 2015/0039352 A1 | 2/2015 | Rempp | |
| 2015/0154712 A1 | 6/2015 | Cook | |
| 2015/0363717 A1 | 12/2015 | Lim | |
| 2016/0012544 A1 | 1/2016 | Ramaswamy | |
| 2016/0266930 A1 | 9/2016 | Jones | |
| 2016/0284029 A1 | 9/2016 | Rhodes | |
| 2016/0335725 A1 | 11/2016 | Philbrick | |
| 2017/0185596 A1 | 6/2017 | Spirer | |
| 2018/0033087 A1 | 2/2018 | Delinselle | |
| 2018/0356241 A1 | 12/2018 | Correnti | |
| 2019/0335006 A1 | 10/2019 | George | |
| 2019/0377103 A1 | 12/2019 | Radich | |
| 2020/0066257 A1 | 2/2020 | Smith | |
| 2020/0143481 A1 | 5/2020 | Brown | |
| 2020/0184591 A1 | 6/2020 | Balu | |
| 2020/0225313 A1 | 7/2020 | Coles | |
| 2020/0226892 A1 | 7/2020 | Coles | |
| 2021/0049440 A1 | 2/2021 | Sim | |
| 2021/0073915 A1 | 3/2021 | Crabtree | |
| 2021/0090694 A1* | 3/2021 | Colley | G16B 30/00 |
| 2021/0097621 A1 | 4/2021 | Fiete | |
| 2021/0127292 A1 | 4/2021 | Van Duren | |
| 2021/0166197 A1 | 6/2021 | Baxter | |
| 2022/0027387 A1 | 1/2022 | Wang | |
| 2022/0051244 A1 | 2/2022 | Silvestre | |
| 2022/0058747 A1 | 2/2022 | Crabtree | |
| 2022/0270176 A1 | 8/2022 | Chintakindi | |
| 2022/0292822 A1 | 9/2022 | Splittstoesser | |
| 2022/0335382 A1 | 10/2022 | Sanchez | |
| 2023/0110486 A1 | 4/2023 | Patt | |
| 2023/0113078 A1 | 4/2023 | Patt | |
| 2023/0115771 A1 | 4/2023 | Patt | |
| 2023/0116513 A1 | 4/2023 | Patt | |
| 2023/0116639 A1 | 4/2023 | Patt | |
| 2023/0116902 A1 | 4/2023 | Patt | |
| 2023/0154266 A1* | 5/2023 | Carter | G06V 20/52 |
| | | | 340/541 |
| 2023/0353603 A1 | 11/2023 | Shen | |
| 2023/0359941 A1 | 11/2023 | Yu | |
| 2024/0177240 A1 | 5/2024 | Patt | |
| 2024/0257592 A1* | 8/2024 | Carter | B64U 50/39 |
| 2024/0291777 A1 | 8/2024 | Fields | |
| 2024/0296502 A1 | 9/2024 | Patt | |
| 2024/0310851 A1* | 9/2024 | Ebrahimi Afrouzi | G01S 17/87 |
| 2024/0320756 A1 | 9/2024 | Patt | |
| 2024/0331067 A1 | 10/2024 | Winans | |
| 2025/0013438 A1 | 1/2025 | Goodman | |
| 2025/0061291 A1 | 2/2025 | Gardner | |
| 2025/0069456 A1* | 2/2025 | Carter | G06V 40/172 |
| 2025/0095643 A1* | 3/2025 | Hwang | G10L 15/063 |
| 2025/0103734 A1* | 3/2025 | Hill | G06F 21/31 |
| 2025/0156456 A1 | 5/2025 | Sun | |

OTHER PUBLICATIONS

ISR in PCT/US2022/045248 dated Mar. 30, 2023.
IPRP in PCT/US2022/045248 dated Apr. 16, 2024.
Vaidya, Sunit "Real-Time Detection of Weather-Based Disasters", Proceedings of the 2nd International Conference on Electronics and Sustainable Communication Systems (ICESC), Coimbatore, India (2021) pp. 1566-1573 (Year: 2021).

* cited by examiner

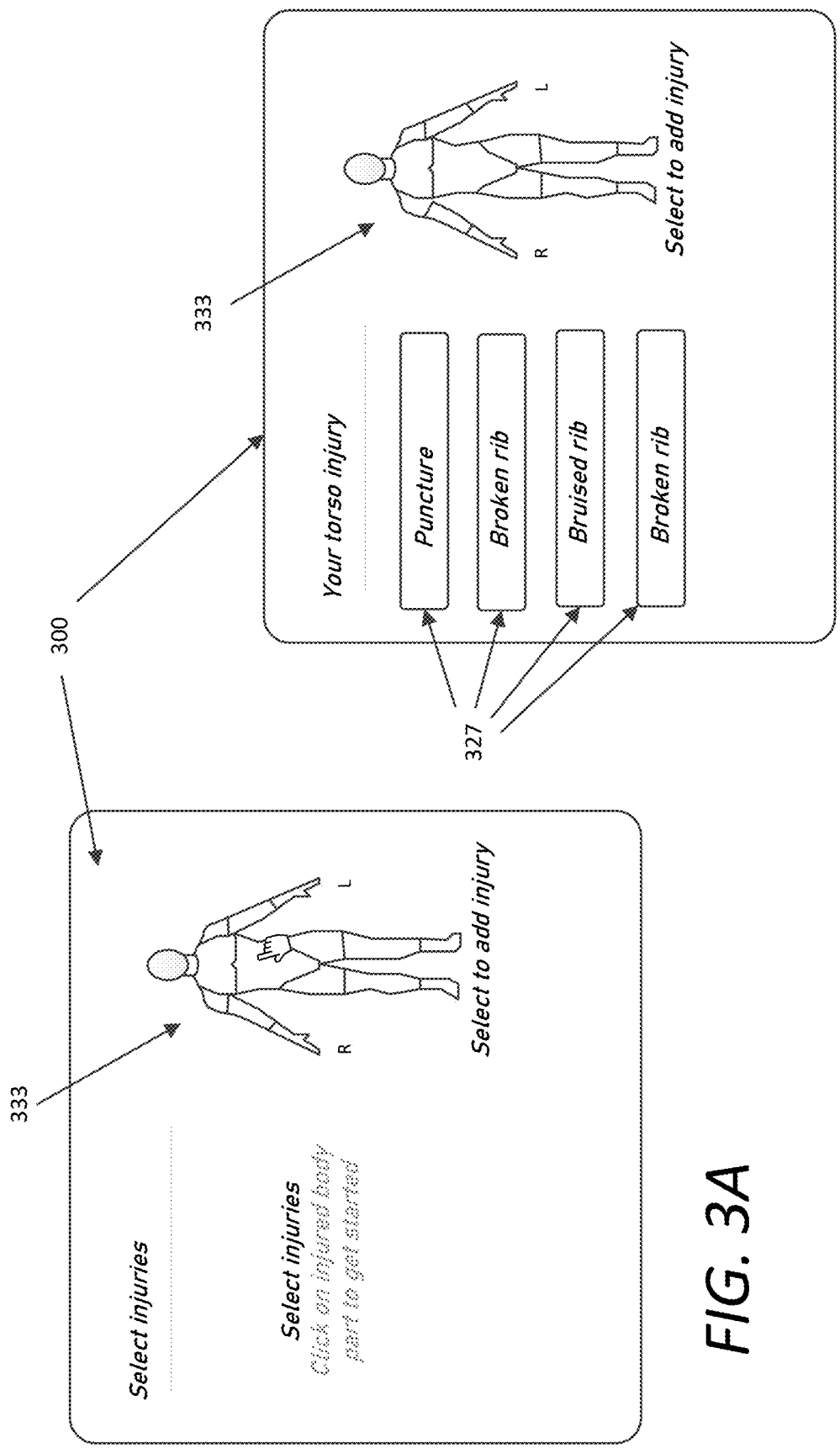

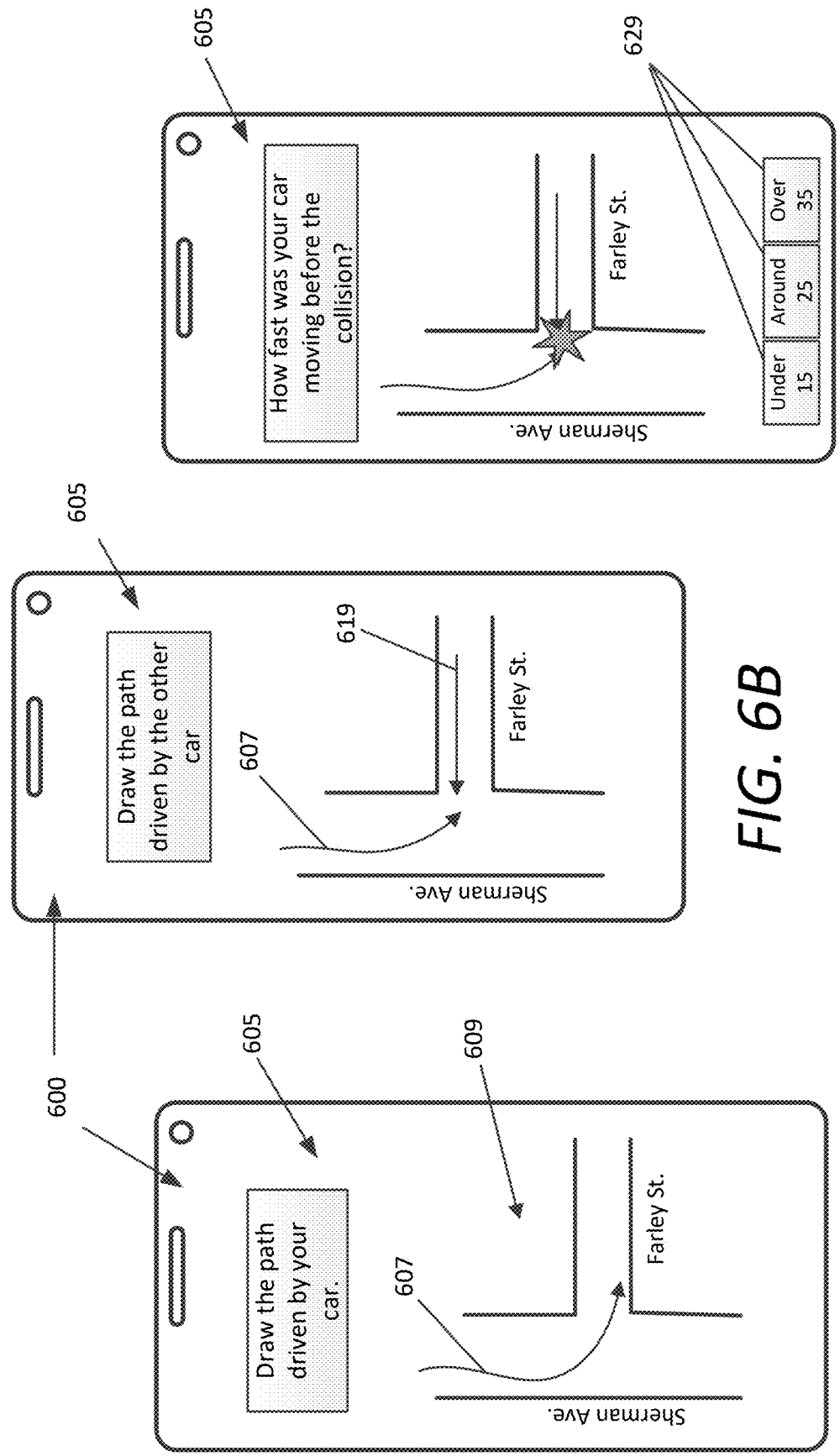

VOICE-AI WARNING SYSTEM FOR PREDICTED EVENTS

CROSS-REFERENCE TO RELATED APPLICATIONS

This application is a continuation of U.S. patent application Ser. No. 18/979,210, filed Dec. 12, 2024, the aforementioned priority application being hereby incorporated by reference in its entirety.

BACKGROUND

Software as a Service (SaaS) providers offer client applications and products that enable access to software-based services and manage the physical and software resources used by the applications. SaaS providers can provide one or more applications to facilitate their various services. With the advent of speech recognition, text classification, natural-language understanding, and artificial intelligence technologies, SaaS providers may automate and individualize services for specific users.

SUMMARY

In accordance with embodiments described herein, a computing system is described that utilizes large language model (LLM) and artificial intelligence technology to provide SaaS clients with a suite of services connected to an "adaptive flow engine," which is defined herein as one or more machine-learning (ML) models executing engagement monitoring and adaptive content or communication techniques to provide individualized user experiences in the field of information gathering and claim processing. In various embodiments, the adaptive flow engine can be trained on a corpus of claim files, which can comprise all information pertaining to claim processes corresponding to claim events.

For each claim process, a claim file can include a first notice of loss (FNOL), which can comprise a first contact by a user that has been affected by or has experienced a claim event, details of those communications (e.g., type of claim event, damage or loss information, evidence of damage or loss, injury information, any vehicles involved, location of event, identification of witnesses, contextual information of the event, and the like). Following the FNOL, a claim process can involve receiving information from other parties to the claim event, such as adverse parties (e.g., for automobile incidents), witnesses, family members, neighbors, and the like. In further examples, the computing system can receive contextual information from third-party computing systems or databases, such as historical information for a particular event location, contextual information regarding contributory factors to a claim event or other causes for the claim event, background information of a user, claimant, witness, or other party to the claim event, and the like.

In further examples, for catastrophic events (e.g., extreme weather events, wildfires, floods, earthquakes, landslides, etc.), a claim file can include predictive information corresponding to the event, and can further provide individualized tasks or checklists for users predicted to be affected by the event, to prepare and mitigate potential damage or loss caused by the predicted event. In such examples, claim files corresponding to these predicted events can include datasets indicating the extent to which a particular user prepared for or otherwise mitigated damage or loss from a predicted event (e.g., whether a user performed mitigative actions on an individualized preparative checklist prior to the event).

Additionally, claim files can include all information after the FNOL for each claim process, which can include injury assistance and healing progress information, medical data (e.g., doctors and medical facilities treating the user), prescription data, settlement negotiation information, final payout information (e.g., for insurers), service provider information (e.g., auto repair, towing, emergency services, etc.), and the like. The ML model(s) execute by the adaptive flow engine can be trained on all of this data, which can comprise on the order of hundreds of thousands or millions of unique claim files, each having its own set of facts and outcomes. Each claim file can also include personal information of the user or claimant, such as demographic information, age, gender, home location, employment status, income or net worth information, and the like.

In accordance with examples provided herein, various services may be powered by the underlying flow engine to provide users with a personalized user experience, which can include any combination of personalized content, messaging (e.g., reminder strategies), and voice-based artificial intelligence (AI). In implementing these services, the computing system described herein can utilize voice-AI technology and other communication means to perform FNOL processes with specific users, make first contact with other parties to a claim process (e.g., witnesses, adverse parties, police, emergency personnel, etc.), perform downstream information gathering to achieve a network effect, provide injury assistance to users, perform automated settlement negotiations, and provide intelligent service assignments. In doing so, the computing system performs automated claim processing for users and policy providers that increases the robustness, trustworthiness, and accuracy of insurance claims.

In certain implementations, a voice-AI engine can be implemented in connection with an LLM and adaptive flow engine to communicate with users. The voice-AI engine can process LLM results, use voice-AI speech technology to converse with users using dynamic scripting generated in real-time based on individualized flows generated by the adaptive flow engine, and in some scenarios, with support from an LLM computing system. As such, the LLM can logically sit atop the adaptive flow engine to constrain prompting, and return LLM results that are highly relevant to the SaaS services implemented by the computing system described herein.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 3A and 3B are example graphical user interfaces enabling a user to indicate injury following an injury event, according to various examples;

DETAILED DESCRIPTION

Figure 1:
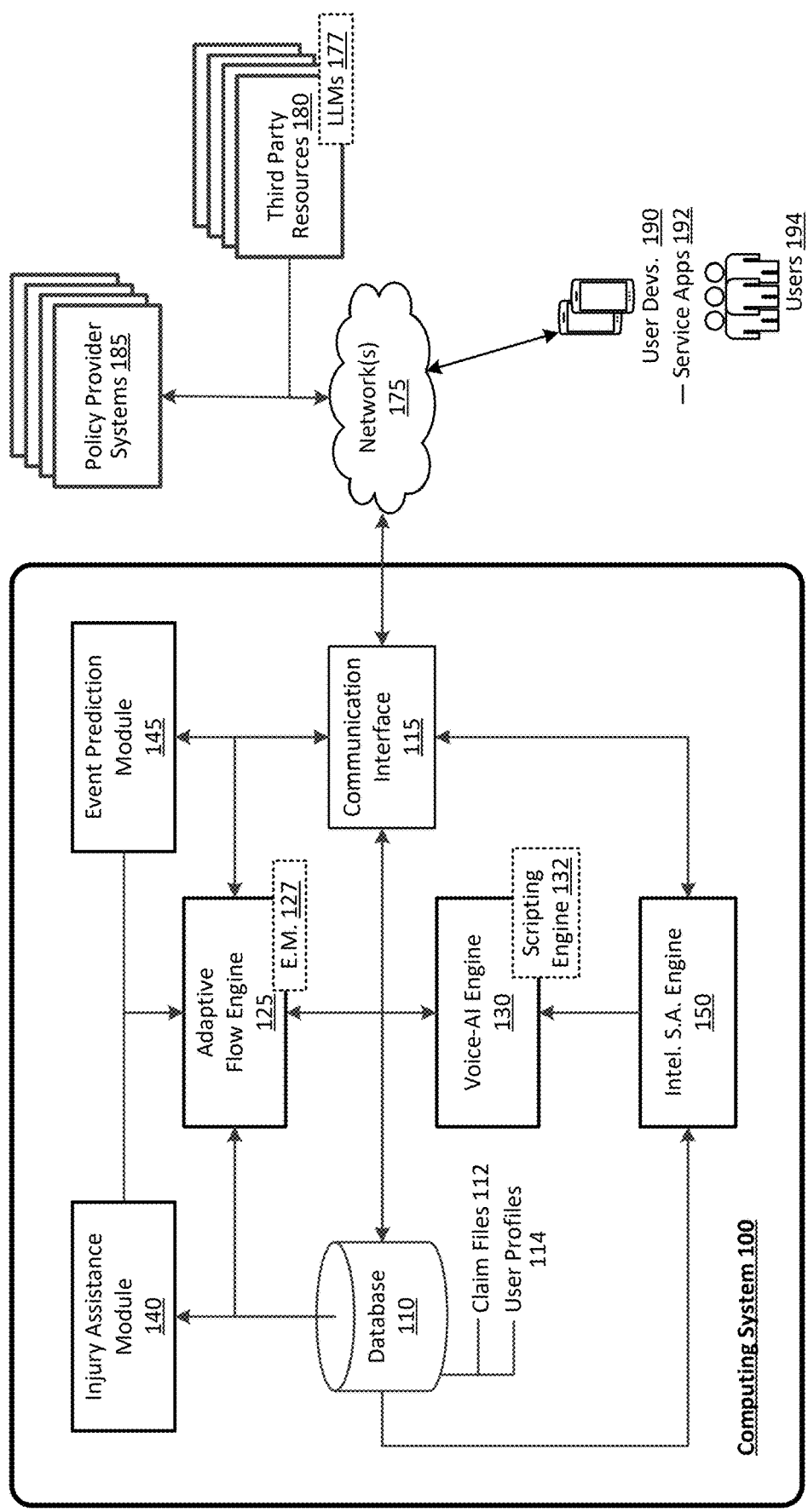
FIG. 1 is a block diagram illustrating an example computing system implementing a suite of SaaS operations, in accordance with examples described herein.

A computing system is described herein that provides computational resources for a Software as a Service (SaaS) provider. The computing system implements a set of optimizations that results in more efficient usage of computational resources, providing a set of application services that require less computing power and less energy than current implementations. These optimizations are correlated to optimizations in the service operations of the SaaS provider, which involve more efficient implementations of current services provided by current SaaS providers.

In various examples described herein, a computing system of the SaaS provider can generate structured, machine-readable data based on user information provided through optimized claim processes in connection with claim events, such as vehicle collision events, injury events, or property damage events. The computing system can further augment the provided data with data from various contextual sources, such as satellite data sources, weather data sources, construction records, traffic data sources, historical data sources (e.g., accident history, crime statistics and trends, previous accident data, traffic incident data for road portions or intersections, etc.), property statistics, vehicle databases, and the like.

The optimized claim processes involve information gathering, augmentation, and artificial intelligence (AI) and deep-learning support to provide policy providers with an efficient and streamlined claim handling process. The optimized claim processes can involve real-time communications with native and/or browser applications executing on computing devices of users, and automated audio calls (e.g., via phone, application, or personal computer) to aid users in the information gathering process corresponding to a claim event. In various examples described herein, the computing system can automate communications with users (e.g., using voice-AI, messaging, or adaptive application content) at any phase of a claim process, such as an initial warning or preemptive preparation phase, the first notice of loss (FNOL) phase, third-party information gathering phase(s), injury investigation phase, settlement negotiation phase, service assignment or recommendation phase, and the like.

In various implementations, the computing system can leverage voice-AI technology to communicate with and assist users at any phase prior to, during, and/or after a claim event and claim process. In further implementations, the computing system can link with any number of third-party resources to generate predictions of damage or loss for a particular event (e.g., a catastrophic weather event, such as a hurricane, tornado, flood, hailstorm, drought, snowstorm, extreme heat event, extreme cold event, and the like). For example, the computing system can include a loss prediction engine that obtains contextual information from the third-party resources (e.g., satellite data, weather event prediction data, storm trace data, probabilistic model data, etc.) and generate various types of severity heat maps for the event over map data for a geographic region predicted to be affected by the event. The computing system can further obtain personal information of users residing or having property within the relevant severity heat map(s), and perform automated voice calls using voice-AI technology to provide specified warnings to the users. Further description of the voice-AI warning system is described below.

For various events that involve damage or loss (e.g., to real property, personal property, vehicles, etc.), a user or the computing system can initiate a first notice of loss (FNOL) session. For example, when a user experiences a vehicle collision or home damage, the user may initiate a service application on a computing device to provide the computing system with an initial indication that a claim event has occurred. Alternatively, the computing system can detect or infer the claim event (e.g., through severe weather tracking, vehicle sensor data, etc.), and initiate contact with the user to perform an FNOL session. As provided herein, the FNOL is typically the first step in a claim process for users when they experience loss, theft, or damage to an insured asset. The FNOL involves the user providing personal details and an initial set of information corresponding to the claim event to the computing system, such as account information, policy information, and an initial statement corresponding to the cause and extent of the loss. In certain scenarios, the user may also provide photographic evidence, video evidence, audio recordings (e.g., of witnesses or other parties to the claim event), and the like.

As provided herein, the information gathering process also involves direct communications with other parties to the claim event and/or other parties that can provide contextual information corresponding to the claim event and/or claimant(s), such as other victims, witnesses, family members, friends, neighbors, police, emergency service providers, medical professionals, repair service providers, and the like. In examples provided herein, the computing system can initiate first contact with these individuals and can further achieve a network affect based on additional information provided by these individuals.

For incidents involving personal injuries, the computing system can further perform machine-learning investigative techniques to both check in on the injured user (e.g., via voice-AI calls) and ensure that the injured user achieves a stable state with regard to the injury (e.g., the user fully heals). In various implementations, the computing system can further determine whether the nature of the injury is consistent with the information provided by the user and any other witnesses to the injury, and can further initiate communications with the injured party at any stage of the recovery process to obtain recovery information of the injured party.

Using the injury data for a particular user, the computing system can initiate an automated negotiator to negotiate a settlement with the user. For non-injury claim events, the computing system can also initiate the automated negotiator to negotiate a settlement. The automated negotiation techniques described herein can utilize the corpus of information from the information gathering process, simulation data from the incident, photographic or video analysis data showing and/or estimating the damage resulting from the incident, reserve estimate information based on the incident, and the injury investigation process to generate a settlement negotiation strategy for the user. This strategy can further leverage a reminder engine to communicate with the user strategically (e.g., to provide the user with the most effective communication methods, cadence, and content) to induce responsiveness. As provided herein, the automated settlement negotiation strategy can be implemented using a combination of voice-AI communications with the user, messaging, and/or application notifications to the user. The injury investigation and settlement negotiation techniques described herein may be performed for injury incidents, property damage incidents, and/or vehicle collision incidents.

In various examples, the computing system can include a "flow engine" or "adaptive flow engine" that processes the unique information in any particular claim file to generate highly individualized "flows," which can comprise any combination of interactive content flows (e.g., sequential user interface pages provided on a computing device of the user) and automated voice-AI calls with custom-generated scripting. In various implementations, the computing system can further include an engagement monitor that receives input data from computing devices of users and performs machine-learning techniques to generate individualized content flows for the users and/or individualized voice communications with the user (e.g., using voice-AI technology). The engagement monitor can further perform adaptation techniques to increase user engagement with the content flows and voice-AI calls to further expedite the information gathering process, as described in detail herein. In further implementations, the computing system can perform machine learning reminder techniques to dynamically adapt, on an individual basis, reminder strategies comprising the methods (e.g., email, SMS, phone call, etc.), cadence or timing, and the content or styling of individual reminders to further induce user engagement with content flows or voice-AI calls in the information gathering process.

For examples in which a vehicle incident occurs, the computing system can obtain a corpus of information related to the incident from the driver, claimant, passenger(s), witnesses, and the like, and can further cascade the information gathering based on information provided by other individuals identified by the original set of individuals. The computing system can contact each of these individuals through various means, and can further leverage the engagement monitoring, reminder strategy, and adaptive flow techniques (e.g., content and voice-AI flows) described herein for each of these individuals to maximize information gathering for the vehicle incident. These techniques are not limited to vehicle incidents, but may also be performed for any information gathering process involving an event, such as an injury event, property damage event, catastrophic weather or disaster event, and the like.

In some examples, when the corpus of information is gathered for a particular incident (e.g., a claim event that may correspond to a subsequent claim filing), the computing system can generate an event reconstruction and LLM summarization of the incident. For a vehicle incident, the reconstruction can include a collision simulation that utilizes the speed and trajectory of the user's vehicle and any other vehicle involved, and can be generated in a simulated location that corresponds to the actual location of the incident (e.g., using satellite imagery of the collision location). This simulation information can be included in the claim corpus, and may further be used in the automated settlement negotiation process.

In various examples, the computing system can further perform the information gathering process for a single incident (e.g., a vehicle incident) or multiple related incidents (e.g., property damage of multiple properties resulting from a single storm) to generate the claim corpus for a particular claim event. For example, the computing system can perform an optimized information gathering process for a single vehicle incident involving two cars, obtain contextual information directly from passengers, drivers, and/or witnesses, augment this contextual information with information from any number of third-party resources (e.g., determine the weather and road conditions at the time of the incident from a weather service, determine the accident history of each driver, determine the accident history at the incident location, determine the right-of-way rules and speed limit(s) at the incident location, determine the time-of-day of the incident, etc.), obtain evidence of vehicle damage from relevant users (e.g., using the guided content capture process), optionally perform image analysis on images and video of the damage to determine estimate repair and/or loss costs due to the incident. The computing system may then process all the information to generate the information corpus for a policy provider of each vehicle owner involved in the incident, and/or policy providers of any individuals injured due to the incident.

In various implementations, the computing system can further provide the user and/or policy provider with a claimview interface that can include interactive links to various aspects of the claim, provide a simulation of the claim event, and can further include an LLM summarization of the claim event. The claimview interface may be used for corroborative purposes, as evidence in a lawsuit or other dispute, and can include a set of fraud scores for the claimant, user, or any other party connected to the claim process.

Examples described herein achieve a technical solution of optimizing information gathering processes, particularly for insurance claims and claim processing for insurance policy providers, in furtherance of a practical application of reducing time from an initial incident to the final step in the claim process (e.g., a settlement or payout). The technical solutions achieved by the various embodiments described herein also involve significantly reduced computing time using machine-learning techniques and automated voice-AI technology that also significantly reduce claim processing time, and further automate previously time-consuming manual procedures that have been observed to cause frustration in policy holders and inefficient delays for policy providers. The SaaS provider implementing the techniques described herein can comprise a single intervening entity between policy holder and policy provider that utilizes deep-learning and artificial intelligence technologies to achieve significant efficiencies in the information gathering and claim administration processes.

As used herein, a computing device refers to devices corresponding to desktop computers, smartphones or tablet computing devices, laptop computers, virtual reality (VR) or augmented reality (AR) headsets, etc., that can provide network connectivity and processing resources for communicating with a computing system over one or more networks. The computing device can also operate a designated application or initiate a browser application configured to communicate with the network services described herein.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, tablet computers or smartphones, laptop computers, VR or AR devices, or network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples include processors and various forms of memory for storing data and computer-executable instructions (including machine learning instructions and/or artificial intelligence instructions).

Examples of computer-readable mediums include permanent memory storage devices, such as hard drives on personal computers or servers. Other examples of computer storage mediums include portable storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer programs, or a computer usable carrier medium capable of carrying such a program.

Examples provided herein can involve the use of machine-learning or machine-learned computer models that are trained using historical and/or real-time training data to mimic cognitive functions associated with humans, such as learning, problem-solving, and prediction, and can comprise computer models trained using unsupervised, supervised, and/or reinforcement learning techniques. The computer models may further comprise artificial neural networks comprising interconnected nodes akin to networks of neurons in the human brain, predictive models comprising one or more decision trees, support vector machines for classification and regression processes, regression analysis models, Bayesian network or Gaussian processing models, and/or federated learning models that perform one or more computing techniques described herein.

Such machine learning models may further be support, combined, or augmented with the use of artificial intelligence (AI) systems (e.g., executing on backend computing systems or third-party computing systems) that implement large language models (LLMs) to achieve generative AI or automated text generation. Such models may provide text, image, video, simulations, and/or augmented reality outputs based on AI prompts that can be configured or fine-tuned for effectiveness using one or more machine-learning techniques described herein.

SYSTEM DESCRIPTION

FIG. 1 is a block diagram illustrating an example computing system 100 implementing a suite of SaaS operations, in accordance with examples described herein. In various examples, the computing system 100 can include a communication interface 115 that enables communications, over one or more networks 175, with computing devices 190 of users 194 of the various services described throughout the present disclosure. The computing devices 190 of the users 194 can execute one or more service applications 192 (e.g., native and/or browser applications) that provide access to the services implemented by the computing system 100. The communication interface 115 further enables communications with computing systems of policy providers 185 and other third-party resources 180 (e.g., real estate databases, tax record databases, insurance record databases, criminal records databases, medical record databases, weather resources, satellite data resources, traffic data resources, vehicular accident history databases, LLM service provides, etc.).

In various examples, the computing system 100 can provide users 194 with a data input service in which users can provide data related to an event (e.g., via a native and/or browser application 192). These events can comprise injury events, collision events involving one or more automobiles, and/or property damage events in which the user's property has been damaged (e.g., by a weather event or natural disaster). In certain implementations, the users 194 can initiate a communication session, such as a first notice of loss (FNOL) session, to provide information related to these events to the computing system 100. For example, the computing system 100 can acquire data related to these events over time and optimize a set of processes for mitigating loss arising from such events. As provided herein, an FNOL session or FNOL filing can comprise an initial communication by a user 194 indicating that a claim process is being initiated, and can further provide an initial report to an insurance provider following loss, theft, or damage of an insured asset.

In certain implementations, the computing system 100 can include an adaptive flow engine 125 that can detect when a user 194 initiates an information gathering process via one or more application sessions to provide details of an incident, such as an automobile collision, injury event, or property damage event. In certain implementations, the adaptive flow engine 125 can progress the information gathering process based on a ruleset (e.g., from an insurance policy provider of the user 194 and/or government regulations), and can involve extensive information gathering steps that may involve call sessions with policy provider representatives, submission of evidence (e.g., photo evidence, video evidence, medical records, contractor receipts or estimates, body shop repair receipts or estimates, etc.), statements from the user 194 and/or witnesses, and the like. Commonly, users initiate the information process but do not complete the process in a single session, or may lapse on one or more steps of the information gathering process.

As provided herein, a user 194 can comprise any individual that initiates a communication session with the computing system 100, or receives communications from the computing system 100. Accordingly, the user 194 can comprise a claimant that initiates a claim process based on a claim event to ultimately receive a compensatory payment for damage, loss, and/or injury resulting from the claim event. The user 194 may further comprise any witness or third-party to a particular claim event, such as a passenger in a vehicle during a collision, a witness to the event, a participant in the event, or an expert (e.g., accident reconstruction expert, medical professional giving an assessment of an injury, and the like).

In various implementations, the user 194 can operate a computing device 190, such as a desktop computer, laptop, tablet computer, or smartphone to launch an application 192 associated with an automated claims processing service implemented by the computing system 100. The application 192 can establish real-time communications between the adaptive flow engine 125 of the computing system 100 and the computing device 190 of the user 194. According to examples described herein, the adaptive flow engine 125 can generate a content flow comprising a series of user interface pages that provide the user with questions and instructions to provide answers, information, documentation, and/or photo or video content relevant to the incident.

In certain implementations, the adaptive flow engine 125 can execute an engagement monitor 127, which can comprise a machine-learning model trained on responsiveness data from a population of users to determine the most effective manner and form of communication(s) to each individual user. As provided herein, effectiveness in terms of responsiveness can involve encouraging or otherwise inducing users on an individual basis to respond to individually tailored communications by performing one or more information gathering tasks, such as performing guided photo capture tasks or engaging with a call representative to progress through an information gathering content flow. The engagement monitor 127 can be trained to determine general behavioral traits based on a user's age, demographic information, home location or area, technological competence or skill, and the like, to determine various communication methods (e.g., text, SMS, email, phone call, etc.), communication times, cadence of communications, and/or content of communications (e.g., basic text, stylized content, email or text links to user interface pages comprising interactive content, etc.).

The individual communication strategies and method(s) for a particular user can be created by the adaptive flow engine 125 using machine learning techniques based on an initial dataset comprising the user's age, gender or sex, demographics, home location or area, policy information, etc., and may be refined based on the actual responsiveness of the user 194 to the various forms and methods of communications. Accordingly at any stage in the information gathering process, the adaptive flow engine 125 can update and implement content flow strategies to facilitate increased responsiveness in communications with the user's computing device 190 (e.g., via one or more service applications 192) over one or more application sessions. Such methods can result in less overall communications with policy holders of any number of policy providers across an entire population, thereby reducing required bandwidth on communication networks.

As an example, when a vehicle incident occurs, the adaptive flow engine 125 can obtain a corpus of information related to the incident from the user 194, who may identify one or more passengers or witnesses. The adaptive flow engine 125 can make first contact with these individuals, who may identify other individuals, which causes the adaptive flow engine 125 to cascade the information gathering based on information provided by these other individuals, as identified by an original set of individuals. The computing system can contact each of these individuals through various means, and can further leverage the engagement monitoring, reminder, and adaptive content techniques described herein for each of these individuals to maximize information gathering for the vehicle incident or other claim events. As such, the adaptive flow engine 125 can facilitate a network effect in which information is gathered and corroborated from maximal sources.

In various examples, the adaptive flow engine 125 can utilize the same user-specific data to generate individualized reminder strategies for each user 194. In certain examples, the user-specific information can be stored in a user profile 114 of the user 194 in a database 110 of the computing system 100. The user profile 114 can include data obtained from the engagement monitor 127 executed by the adaptive flow engine 125 (e.g., a trained machine learning model) that processes various responsiveness metrics of the user 194 to determine the most effective methods of communicating with the user 194, including the timing of communications, the type of communications (e.g., SMS message, phone call, email, etc.), and the styling of the communications (e.g., font, font weight, styling features, content features, etc.). The adaptive flow engine 125 can be initiated by the computing system 100 to implement the individualized and optimized reminder strategy to induce the user 194 to complete one or more steps of the information gathering process. In certain examples, the optimized reminder strategy can be tailored to maximize (i) an individual conversion rate of the user, and (ii) individualized satisfaction of the user in completing the claim process or a content flow of the claim process.

As an example, the user 194 may initiate a first notice of loss on the user's computing device 190 via one or more application sessions and begin, but not complete, an information gathering process for a claim event (e.g., a vehicle collision). The adaptive flow engine 125 can automatically save a state of a claim file 112 corresponding to the information gathering process for the user 194, such that the user 194 does not need to repeat any portion of the information gathering process.

In various examples described herein, the computing system 100 can include a voice-AI engine 130 that dynamically communicates with the adaptive flow engine 125 to communicate with a user 194 via voice calls. The voice-AI engine 130 can simulate a human voice, and can be driven by adaptive flows from the adaptive flow engine 125 (e.g., based on strategies generated by the engagement monitor 127 and reminder engine). Thus, any specified timing of communications determined by the engagement monitor 127 can train the voice-AI engine 130 to make calls to a particular user 194. In various examples, the voice-AI engine 130 can further include a scripting engine 132 that can generate a dynamic script for voice communications with a user 194. As provided herein, this dynamic script can be updated and recalculated based on voice responses provided by the user 194.

According to examples, the voice-AI engine 130 can initiate communications with a user 194 in accordance with the information gathering process. For example, the voice-AI engine 130 can make voice calls to a user 194 for reminders, to complete an FNOL process, to perform settlement negotiations, and the like. In further implementations, the voice-AI engine 130 can make first contact with other parties connected to a particular claim file 112, such as family members to the user 194, neighbors, witnesses, adverse parties, other occupants in a vehicle that has experienced a collision, emergency responders, police officers, medical professionals, and the like.

In further examples, the voice-AI engine 130 can gather downstream information that may arise from communications with any of the aforementioned parties. For example, if a witness to a vehicle incident mentions a name of someone who could provide additional information, the voice-AI engine 130 can perform a lookup of the contact information for that individual, and initiate a voice call with that individual to gather additional information pertaining to the vehicle incident. Furthermore, the adaptive flow engine 125 can initiate the engagement monitor 127 for these individuals to generate an individualized communication strategy (e.g., any combination of application content, messaging, voice calls, etc.). When voice calls are determined to be optimal for any individual, the voice-AI engine 130 can initiate calls in accordance with the individualized communication strategy generated by the adaptive flow engine 125, and can further initiate dynamic scripting using the scripting engine 132 based on an individualized voice communication strategy for the individual.

As provided herein, individualized voice communication strategies can be determined based on the engagement and responsiveness of an individual to various aspects of voice-AI speech, such as tonality, words used, sentence style, accent, male versus female voice, speech speed and cadence, and the like. As such, the engagement monitor 127 and scripting engine 132 can tune the voice-AI engine 130 to communicate with any individual in a customized manner to maximize information gathering and call completions. As further provided herein, a call completion can comprise the completion of a dynamic script for the call, which can be generated with the goal of obtaining any relevant contextual information the individual may have that pertains to the claim file 112.

Accordingly, the voice-AI engine 130 can be leveraged as one of multiple communication tools for the adaptive flow engine 125, and can be driven by individualized strategies generated by the engagement monitor 127 using the dynamic scripting engine 132. It is contemplated that this voice-AI technology can be implemented for performing an FNOL process, making first contact with individuals associated with a claim file, perform downstream communications with these individuals and anyone else of interest to achieve a network effect for information gathering, and can perform addition functions. For example, the voice-AI engine 130 may be utilized to provide preemptive warnings to users 194 that may experience a catastrophic event, such as a severe weather event (e.g., tornado, hurricane, hailstorm, etc.).

In certain implementations, the computing system 100 can include an event prediction module 145, which may communicate with various third-party resources 180 to generate event predictions that may affect the user 194 or the property of the user 194. In various examples, the event prediction module 145 can receive real-time monitoring data from computing systems of event monitoring resources, such as weather forecasting services, satellite imaging services, traffic services, public services indicating road construction or building construction, and the like. Based on the monitoring data, the event prediction module 145 can predict that an event will affect a given area that includes the properties of a subset of the users 194. The predicted event can comprise a catastrophic event, such as a severe storm, a wildfire, extreme heat or cold, drought conditions, a water shortage, a flood, a power outage, a mudslide, and the like.

In certain implementations, the event prediction module 145 can generate a severity heat map providing severity gradients in the given area detailing predicted locations or sub-areas that will be affected more severely and locations or sub-areas that will be affected more moderately or mildly. In certain implementations, the event prediction module 145 can access the historical data (e.g., stored in a local database 110 or accessed remotely from a third-party resource 180 via the one or more networks 175) to identify similar events, the characteristics of the predicted area to be affected (e.g., topography, flood plain information, drainage information, historical rainfall level versus current rainfall level, construction regulations, local construction norms, power grid information, etc.) in order to predict a set of risks for the given area and to those residing or owning homes or businesses in the given area.

In further examples, the event prediction module 145 can further receive property data for the predicted area to be affected, and/or policy data from policy profiles of users 194, to determine the properties and people that are to be affected by the predicted event, and how severely they are likely to be affected. In various implementations, the event prediction module 145 can provide the severity heat map and an event trigger indicating the properties and people (e.g., a subset of the users 194) predicted to be affected to the adaptive flow engine 125 of the computing system 100. The adaptive flow engine 125 can communicate with users 194 through interactive content and/or via the voice-AI engine 130 to provoke preventative or mitigative behavior to mitigate predicted loss of life and property damage prior to an event.

As an example, when the event prediction module 145 identifies a catastrophic weather event that will affect the home of a user 194, the event prediction module 145 can trigger the voice-AI engine 130 to may a phone call to the user's phone or computing device 190 to warn the user 194 of the risks to the user's property. The conversation between the voice-AI engine 130 and the user 194 can be supported by the location of the user's property within a severity heat map for the severe weather event, and can further request that the user 194 perform a set of mitigative actions (e.g., via a customized interactive interface based on the unique characteristics of the user's property). Accordingly, the communications with the user 194 can comprise a combination of voice-AI calls and interactive content to facilitate the user 194 in preparing for the event.

As another example, the voice-AI engine 130 may be utilized to provide intelligent service assignments for a user 194, as discussed below, or for performing voice-based, automated settlement negotiations with a user 194, as further described below. For example, while the information gathering process progresses for a claim file 112 based on strategic communications, an intelligent service assignment engine 150 of the computing system 150 can generate a ranked list of service providers to, for example, repair the user's vehicle, tow the user's vehicle (e.g., to a repair shop or salvage yard based on damage severity), provide the user 194 with a rental vehicle, repair the user's home, provide medical assistance or care to the user 194, provide physical therapy for the user 194, and the like.

The intelligent service assignment engine 150 can receive the corpus of information corresponding to the user's claim, and filter a set of service providers based on the service(s) needed by the user 194, proximity to the user's location (e.g., the user's home location or a break-down area where the user's vehicle is stranded), specializations of the service providers (e.g., providers specializing in smoke damage, water damage, construction, specific types of vehicle damage), effectiveness of work by the service providers, quality of work, communication responsiveness, general speed of work, cost of the work, and the like. In certain examples, the intelligent service assignment engine 150 can utilize these metrics and further generate rankings of servicers based on the user-specific information of the user 194, such as predictive information regarding whether the user 194 is likely to be satisfied with the service provider's work.

For example, based on profile information of the user 194—which can include the user's age, demographic information, sex or gender, location, any affiliations of the user 194, income information, wealth information (e.g., net worth), home value, vehicle type, etc.—the intelligent service assignment engine 150 match the user 194 with service providers using a matching algorithm. The matching algorithm can obtain all user-specific information and the various metrics of the service providers (e.g., quality of work, estimated times of completion of the work required, cost or rates of the service providers, location or proximity to the user's home location, etc.) to determine the optimal service provider(s) for the user 194.

As an example, the user 194 may be involved in a vehicle collision in which repairable damage has resulted. The matching algorithm may determine that the user 194 may not have enough income for the highest quality repair shops, and yet can afford two or three lower quality, but still effective repair shops. Based on the user's vehicle, the matching algorithm can filter these more affordable service providers that specialize in the user's specific type of vehicle, and then rank the remaining service providers based on, for example, historical ratings, proximity to the user's home location, public transport accessibility (e.g., if the user 194 or user's family does not have another vehicle), and the like. The intelligent service assignment engine 150 may then provide the user 194 with the recommended service provider, or a ranked list of service providers. In certain examples, when the user 194 makes a selection, the intelligent service assignment engine 150 can automatically schedule a service appointment for the user 194.

In various examples provided herein, the intelligent service assignment engine 150 can provide triggers to the voice-AI engine 130 to initiate voice calls to the user 194 to provide the user 194 with service assignment information. For example, if the user 194 is involved in a vehicle incident, the intelligent service assignment engine 150 can trigger the voice-AI engine 130 to phone the user 194, and further trigger the scripting engine 132 to inform the user 194 of the top ranked service providers.

For incidents involving the user's vehicle, the computing system 100 can receive an identifier of the user's vehicle, such as a vehicle identification number (VIN) or license plate identifier. For example, the computing system 100 can receive this identifier via a lookup of an insurance policy of the user 194, via input by the user 194 during an application session, or during a guided photo capture process with the user 194. Once the identifying information is received, the computing system 100 can obtain other vehicle information of the user's vehicle, such as the year, make, model, color, accident history, and the like. As provided herein, this additional information may be used by one or more modules of the computing system 100 to, for example, determine a value of the vehicle, repair costs, repair parts, etc.

In certain implementations, the computing system 100 can include a guided content capture module that communicates with the user's computing device 190 (e.g., via a native application or browser application) to guide the user 194 in capturing photo content and/or video content of the user's vehicle or property. The guided content capture module can provide a set of guided content capture interfaces that provide the user 194 with a tutorial of the content capture process and then requests that the user 194 capture specified images or video of the user's vehicle, as discussed in detail below.

In one scenario, the user 194 may be in a call session with the voice-AI engine 130, which can request images or video of damage to the user's vehicle. The voice-AI engine 130 may send the user 194 a text message or email providing a link, which when selected by the user 194, can automatically cause the browser application (or a native application) to execute on the computing device 190 of the user 194. As provided herein, the browser application (or native application) can provide the user 194 with a brief tutorial, and then generate the content capturing interface with a request to capture specific angles or portions of the user's vehicle. In doing so, the browser application (or native application) accesses the image sensors of the user's computing device 190, and communicates with the guided content capture engine to execute real-time computer vision and analysis techniques to identify when the specified portion of the user's vehicle is aligned with the matching vehicle outline. When the application and/or backend computing system determines, via real-time image analysis, that the specified portion of the user's vehicle is aligned with the vehicle outline, the browser application and/or backend computing system can trigger the content capture interface displayed on the user's computing device to indicate the alignment to the user 194. In one example, the browser application can perform edge detection and/or identify contoured portions in the image data to identify the vehicle being aligned with the outline.

For example, the content capture interface can provide a notification to "take a picture," which can induce the user 194 to capture the image, and/or the content capture interface can provide color indication of alignment (e.g., change from a neutral color or tint to a green color or tint). In variations, the browser application (or native application) can detect the alignment and automatically capture the image or video of the specified portion. It is contemplated that because this process is performed in real-time with the user 194, as opposed to the user submitting captured images, the probability of fraud or deception is zero or near zero. Furthermore, while the guided content capture features are described herein as being performed by or in connection with a browser application, any of the techniques described here may also be performed by or in connection with a native application.

In certain examples, the content capture interface can present a request to capture the VIN or license plate of the vehicle (e.g., located on a lower portion of the vehicle's windshield or inside door panel). For example, when the vehicle's make, model, and or model year are not known, the content capture interface can present the VIN or license plate capture request. When the camera captures the VIN or license plate (e.g., via camera input by the user or automatically via image analysis by the application and/or backend computing system), the guided content capture engine can perform a lookup of the vehicle details using the VIN or license plate to generate the outlines for capturing exterior damage to the vehicle. In further examples, when damage is present in the interior of the vehicle, the guided content capture engine can perform the same or similar process to generate interior outlines specific to the user's vehicle or type of vehicle or the content capturing process.

For incidents involving injuries, the computing system 100 can initiate an automated injury assistance module 140 that can process the various information provided by a user 194 corresponding to a claim event. When the user 194 indicates an injury, the automated injury assistance module 140 can initiate an in-depth question and answer session with the user 194 (e.g., via the voice-AI engine 130), requesting that the user 194 provide detailed information about the user's current injury resulting from the claim event, any past injuries, current and previous treatments for injuries, any current and previous medications prescribed to the user 194, specific quantities, dosages, physical restrictions, whether the user 194 is wearing a cast, any surgeries resulting from the current injury, past surgeries, doctor information (e.g., name, medical facility, area of practice), hospital information, and the like.

In certain examples, the automated injury assistance module 140 can perform this injury information gathering process over one or more application sessions via a service application 192 executing on the computing device 190 of the user 194, via messages (e.g., text messages or email), and/or via voice calls to the user's phone. The automated injury assistance module 140 can further utilize the adaptive flow engine 125 to provide the user 194 with an individualized reminder strategy to continue and complete the injury information gathering process using customized content for the user 194 and/or voice-AI calls to the user 194.

In various examples, based on an initial set of information from the user 194 (e.g., FNOL information), the automated injury assistance module 140 can perform a lookup of a national provider identifier (NPI) of the user's doctor(s) to match information provided by the user 194 to information included in one or more medical databases. Covered health care providers and all health plans and health care clearinghouses are mandated to use NPIs in administrative and financial transactions adopted under the Health Insurance Portability and Accountability Act (HIPAA). The NPI is a 10-position, intelligence-free numeric identifier (10-digit number), which means that the numbers do not carry other information about healthcare providers, such as the state in which they live or their medical specialty.

As the user 194 gets medical care for the injury or injuries in a recovery phase, the automated injury assistance module 140 can perform point-in-time check-ins with the user 194. These point-in-time check-ins can utilize an injury reminder strategy that can be based on the user's actual appointments with, for example, medical care providers (e.g., doctors and nurses), physical therapists, and/or any specialists assigned to the user 194. Additionally or alternatively, the injury reminder strategy can be based on machine learning data for similar injuries to the user 194 and the treatment plans for those injuries. For example, the automated injury assistance module 140 can provide the user 194 with conversational questions at specified times using the voice-AI engine 130, such as "have you gotten your cast removed?" or "did you go to your physical therapy appointment yesterday?"

Accordingly, the automated injury assistance module 140 can act as an automated personal assistant (e.g., executable as a service application 192 on the user's computing device 190 or through voice-AI calls) specifically for aiding the user 194 in recovering from the user's injuries. In doing so, the automated injury assistance module 140 can be programmed with artificial intelligence software, or can leverage third-party artificial intelligence (e.g., via an operating system of the user's computing device 190), to provide a personalized user experience for the user 194 specifically for the purpose of recovering from injuries or generally receiving medical care. As such, the automated injury assistance module 140 can provide reminders—via phone call or message—to the user 194 to schedule medical appointments, physical therapy appointments, pharmaceutical deliveries, etc., provide reminders for the appointments, confirm that the user 194 attended appointments, and periodically checking in with the user 194. For implementations in which the user 194 has authorized access to location resources, the automated injury assistance module 140 can further automatically confirm that the user 194 attended appointments based on matching location data of the user's computing device 190 to physical locations corresponding to the appointments (e.g., using a mapping resource).

In some aspects, the periodic check-ins can be continued by the automated injury assistance module 140 until the user 194 achieves a stable state with respect to each of the user's injuries (e.g., either the user 194 heals completely or heals to the point of a permanent disability). For example, the automated injury assistance module 140 can check-in voice calls to the user 194 using the voice-AI engine 130. In certain implementations, the automated injury assistance module 140 can also perform verification techniques to determine whether the user 194 is being truthful about receiving health care or prescription medications (e.g., cross-checking the user's provided information with information matched to NPI numbers, or performing location matching techniques).

In various examples, the automated injury assistance module 140 can utilize the injury information of the user 194 to verify truthfulness (e.g., detect fraud) and/or predict an eventual settlement offer for the user 194. The prediction of the eventual settlement can comprise an optimization (e.g., a machine learning optimization) based on the full corpus of injury information and historical settlement data for similar injuries, treatment plans, medical care and coverage, healing time, and the like. The automated injury assistance module 140 can further generate the predicted settlement amount based on the personal information of the user 194, such as the user's demographic information (e.g., location, income, age, etc.), home location, etc.

According to one or more embodiments, the automated injury assistance module 140 can further identify any inconsistencies or deltas in the information provided by the user 194. For example, if the user 194 describes in a voice call that a minor arm sprain resulting from a car accident is nearly healed at a first time, and then indicates in a second voice call that the arm injury is extremely serious at a second time significantly after the first time, the automated injury assistance module 140 can flag the claim for potential fraud. In such a scenario, the automated injury assistance module 140 can be triggered, based on an initial flag, to process all claim information for the claim event and determine a set of information items that could potentially indicate that the user 194 is potentially going to file a fraudulent claim.

For example, the automated injury assistance module 165 can identify in the claim file 112 of the user 194 that, prior to making the assertion that the minor arm injury is extremely serious, the user 194 indicated that a lawsuit was filed against a defendant in the claim event, or that the user 194 has hired an attorney. In various examples, the automated injury assistance module 165 can establish one or multiple criteria or thresholds for flagging fraud, triggering a fraud detection component to perform further analysis of the user's 194 claim file 112, and/or provide an indication, probability, or fraud score on a claim view interface viewable by a policy provider or investigator of the user 194.

In various implementations, the computing system 100 can generate an AI prompt for a third-party resource 180 executing a LLM 177 to automatically generate a LLM summary of a particular claim file 112 or claim event. The AI prompt can cause the LLM 177 executing on the computing system of a third-party resource 180 to generate an optimally concise and valuable claim file summary and/or claim event summary (e.g., four-word to four sentence summary of the claim) for the purpose of expediting one or more processes in the overall claim process. The processes can include initial claim sorting or classification of the claim file 112 (e.g., automated or manual) or claim flagging (e.g., for fraud, expedited payout, or further investigation).

For example, a particular claim file 112 for a vehicle incident can comprise a corpus of information amounting to hundreds or thousands of information items that may include millions of words, including individual descriptions of the vehicle incident by each passenger, driver, and witness (e.g., headings, approximate speeds, vehicle types, location, etc.), descriptions of damage to each vehicle in the incident, descriptions of injuries, descriptions of medical assistance, care, treatments, and recovery details for each injured individual, policy coverages for each individual, police reports, liability or fault of each driver, any sensor data from the vehicles or cameras surrounding accident location (e.g., IMU or image data), damage information to other objects, items, buildings, and the like. The computing system 100 can parse the entire corpus of information to generate an optimized AI prompt specifically for an LLM 177 to create a LLM summary for the entire corpus.

It is contemplated that certain LLMs 177 provide LLM summarizations that may focus on certain details that may not be interesting or relevant for a particular purpose. For example, for claim file summaries, certain AI prompts can cause LLMs 177 to provide summaries that include information that is unhelpful for the purposes of processing a claim (e.g., unnecessary facts about a vehicle). The computing system 100 can be trained based on the outputs of the LLM 177 for the specific purpose of providing optimized claim summaries for policy providers and/or claim investigators. In various examples, the LLM summaries can be provided on a claim view interface that includes interactive features enabling a user 194, policy provider representative, or claim investigator to view a simulation of the vehicle incident, any reports or statements, any fraud flags trigger by any engine or module of the computing system 100, etc.

As such, the computing system 100 performs language cleaning or pre-processing to make the LLM engines 177 of the third-party resources 180 (e.g., CHATGPT® or GOOGLE GEMINI®) more efficient and effective for claim purposes. This cleaning or pre-processing can include automated removal or rephrasing of AI prompt language that an LLM engine is known to fixate on, or suppression of irrelevant language, to provide the LLM engine 177 with an effective AI prompt. Additionally, upon transmitting the prompt to the LLM engine 177, the computing system 100 can receive the LLM summary and perform automated post-processing, which can comprise automated tools for editing and word suppression to generate the finalized LLM summary.

In the post-processing phase, the computing system 100 can include an editing tool that automatically suppresses irrelevant information or edits the LLM summary for relevance and brevity. As such, the LLM summary provided to the user 194, policy provider, claim investigator, attorney, or medical care provider can comprise only the most relevant information corresponding to the claim file 112 or the claim event specific for the purposes of those individuals.

In various examples, the adaptive flow engine 125 can also communicate with the voice-AI engine 130 to perform automated settlement negotiations with a user 194. In doing so, the adaptive flow engine 125 can execute a machine-learning model trained to close or finalize a particular claim process corresponding to a claim file 112. The adaptive flow engine 125 and voice-AI engine 130 can provide an individualized negotiation experience to the user 194 to settle a particular claim (e.g., similar to the customized reminder strategy and dynamic content flows provided to the user 194 described herein). For examples, the adaptive flow engine 125 and voice-AI engine 130 can initiate a negotiation process based on the corpus of information gathered during the various information gathering processes to create the claim file 112 for a particular claim event (e.g., a vehicle incident).

In certain embodiments, the adaptive flow engine 125 and voice-AI engine 130 can leverage artificial intelligence techniques to perform sentiment analysis on the user's voice responses to the voice-AI, content, or messages that provide a settlement offer for a particular claim. In such an example, the adaptive flow engine 125 and voice-AI engine 130 can access a camera or other sensors on the computing device 190 of the user 194 (e.g., via an executing service application 192 or operating system), perform audio voice processing to determine sentiment for voice calls, and/or can be supplemented with machine-learning techniques to provide the user 194 with customized scripting and/or content flows providing a settlement offer and negotiation content (e.g., based on the user's inferred content preferences). The sentiment analysis performed by the adaptive flow engine 125 and voice-AI engine 130 can be used to determine whether the user 194 is willing to accept the settlement offer or is likely to reject the settlement offer (e.g., generating probabilities of acceptance or rejections).

In various examples, the adaptive flow engine 125 and voice-AI engine 130 can comprise a trained machine learning model and/or can leverage artificial intelligence techniques to continue the negotiation using a maximum threshold as a reference (e.g., based on a reserve estimate calculation for the claim event). Furthermore, the adaptive flow engine 125 and voice-AI engine 130 can obtain user-specific information of the user 194, such as demographic information, home location, the details of the user's vehicle or property, and the like, to generate an individualized negotiation strategy specifically for the user 194. The negotiation strategy can further utilize engagement monitoring and reminder techniques described herein to further provoke the user 194 in engaging with the adaptive flow engine 125 and voice-AI engine 130. In certain examples, the negotiation engine 150 can automatically provide an initial settlement offer to the user 194 using one or more communication means (e.g., email, text, phone call), which the user 194 can accept or decline.

In certain examples, if the user 194 declines, the adaptive flow engine 125 and voice-AI engine 130 can analyze and make automated inferences about certain aspects of the rejection by the user 194, such as the user's sentiment based on whether the user 194 ignores the settlement offer, image or video data of the user 194 (e.g., when the user 194 receives a settlement offer), whether the user 194 has representation by an agent or attorney, and the like. Based on this information, the adaptive flow engine 125 and voice-AI engine 130 can adapt the individualized negotiation strategy for the user 194 to generate a second offer (or next sequential offer), escalate the negotiation to a human representative or negotiator, or conclude the negotiation.

If the user 194 accepts a particular settlement offer, the adaptive flow engine 125 and voice-AI engine 130 can transmit an electronic document detailing the agreed upon settlement offer to the user 194 (e.g., via a preferred communication method or the service application 192) to provide an e-signature for the settlement offer. Thereafter, the claim file 112 for the user 194 can be archived or closed or may be used as training data for the machine-learning models described herein.

Examples described herein can implement engagement monitoring techniques corresponding to a user's engagement with the voice-AI engine 130 and the various user interfaces described herein. In such examples, the system can monitor various combinations of the user's inputs, view-time or display-time on any particular page or screen, the content presented on the display of the user's computing device 190 at any given time, image data of the user's face (e.g., showing a lack of interest), and the like. Based on the engagement information of a particular user 194 (e.g., a claimant or a corroborating party), the adaptive flow engine 125 can dynamically adjust content flows presented to the user 194, and/or voice call strategy using the voice-AI engine 130 to maximize engagement and/or information gathering. In one example, the adaptive flow engine 125 may determine, based on the engagement data from monitoring the user 194, that the user 194 is losing interest in engaging with a particular user interface, voice call, or content item, and adjust the voice-AI or content presented to the user 194 on the service application 192 or browser application in order to increase the user's engagement. The determination of engagement level of a user 194 by the adaptive flow engine 125 may be based on a confidence threshold or probability of the user 194 hanging up a call or exiting an application within a given time frame (e.g., the next five seconds).

As provided herein, the engagement monitoring, dynamic content flow adjustments, and voice-AI call strategies may be performed for users, claimants, and corroborating parties at any phase of the claim process. As an example, during an information gathering phase for a particular claim, a witness may be presented with a series of queries relating to the claim event. The dynamic content generator 155 may implement engagement monitoring and dynamic content adaptation techniques to compel or influence the witness to complete the information gathering flow generated by the computing system 100.

Example Preparedness Content

Figure 2A:
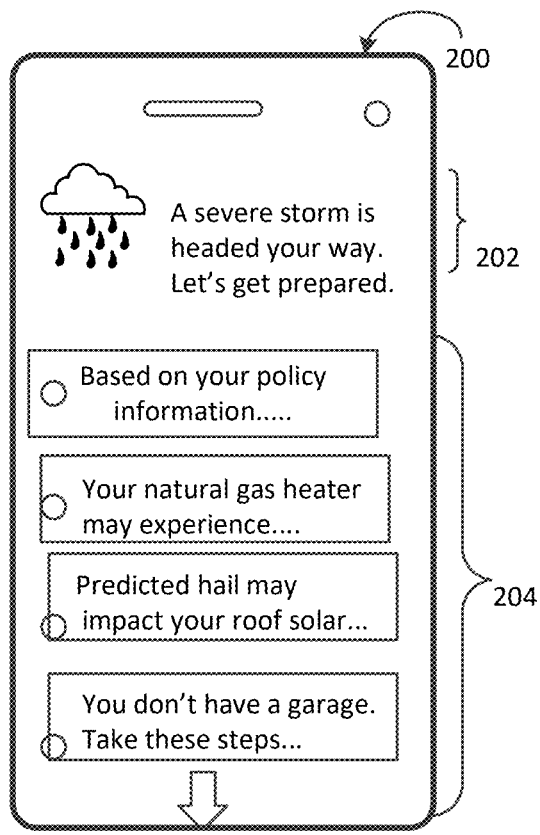
FIGS. 2A and 2B are example graphical user interfaces showing targeted content being presented to a user, according to various examples.
Figure 2B:
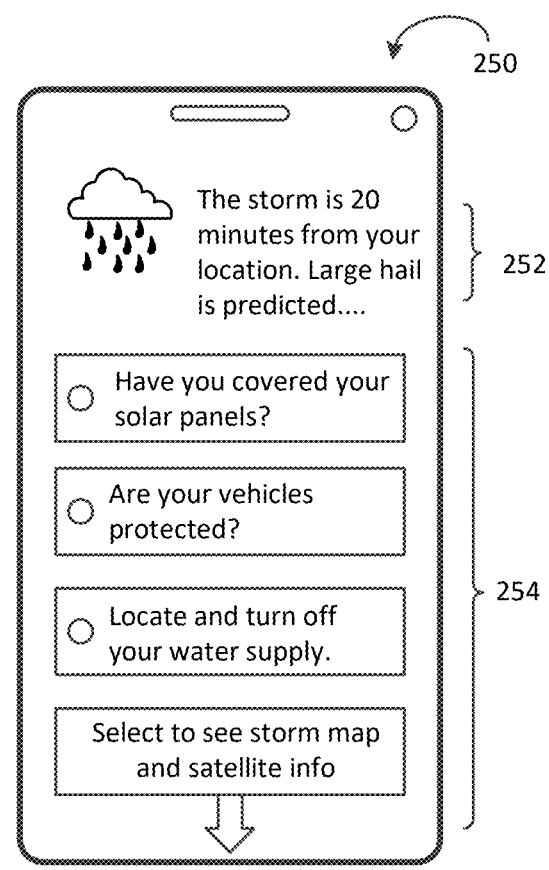

FIGS. 2A and 2B are example graphical user interfaces (GUIs) showing targeted preparedness content being presented to a user 194, according to various examples. For example, the user 194 may be contacted based on the user's property being within a hazard zone of a severity heat map for a predicted event, such as an earthquake, flood, wildfire, hurricane, tornado, hailstorm, drought, temperature anomaly, landslide, and the like. In such an example, the voice-AI engine 130 can be triggered by the event prediction module 145 to initiate a phone call with the user 194, and provide a warning to the user 194. If the user 194 is interested in being provided with a checklist of mitigative actions to perform, then the adaptive flow engine 125 can provide the user 194 with customized user interfaces 200, 250 like those shown in FIGS. 2A and 2B based on the unique characteristics of the user's property and the predicted risks.

Referring to FIG. 2A, the user's computing device can present an individualized preparedness interface 200 that provides the user with an alert 202 corresponding to a catastrophic event that is predicted to affect the user and/or the user's property. The preparedness interface 200 can be based on the policy information of the user and/or information obtained from third-party resources that identify the unique characteristics of the user's property. Accordingly, the preparedness interface 200 can display a customized set of items 204 for the user to consider or perform in order to mitigate or prevent loss or damage from the predicted event. As shown in FIG. 2A, each action item in the set 204 may be selectable to provide the user with additional information regarding each determined risk to the user's property and suggested actions to perform to address each risk.

In some examples, the set of items 204 may be presented in a prioritized manner, for example, based on value, potential damage cost, and/or items that correspond to higher risk of loss or damage. In such examples, higher priority action items may be presented at the top of a scrollable list or more prominently on the display screen of the user's computing device. For voice-AI implementations, the higher priority actions items may be discussed first with the user 194 in performing the mitigative tasks.

FIG. 2B shows an example GUI presenting an individualized dashboard for an event, according to various examples. The GUI shown in FIG. 2B may be presented to the user 194 as a predicted event approaches. It is contemplated that individually tailored content providing dynamic, highly localized event updates and mitigation content for users 194 can further increase safety and loss prevention. Referring to FIG. 2B, the event dashboard 250 can be presented on a user's computing device 190 (e.g., through execution of a designated service application 192). In further examples, when updates are detected, the system 100 can provide notifications to each affected user 194 (e.g., voice-AI calls, text updates, push notifications, etc.).

In certain examples, the event dashboard 250 can include an event update 252 that provides localized updates for the user 194 or the user's home. In further examples, the event dashboard 250 can also provide the user 194 with a set of interactive reminders, updated mitigative tasks, and/or added event information 254. This information 254 can be interactive, and can enable the user 194 to provide the computing system 100 with contextual information about whether the user 194 has performed mitigative tasks, or whether the user 194 may have experienced loss, damage, or injury.

Example FNOL Interface

Figure 2C:
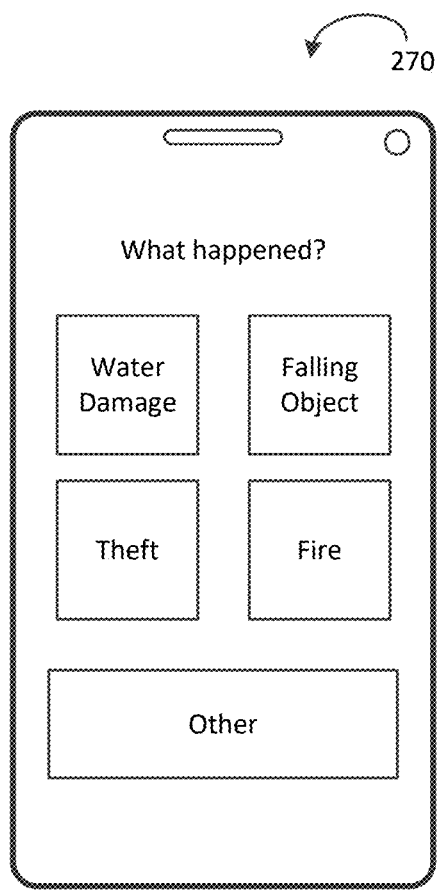
FIGS. 2C and 2D are example graphical user interfaces presented to a user following a claim event, according to examples described herein.
Figure 2D:
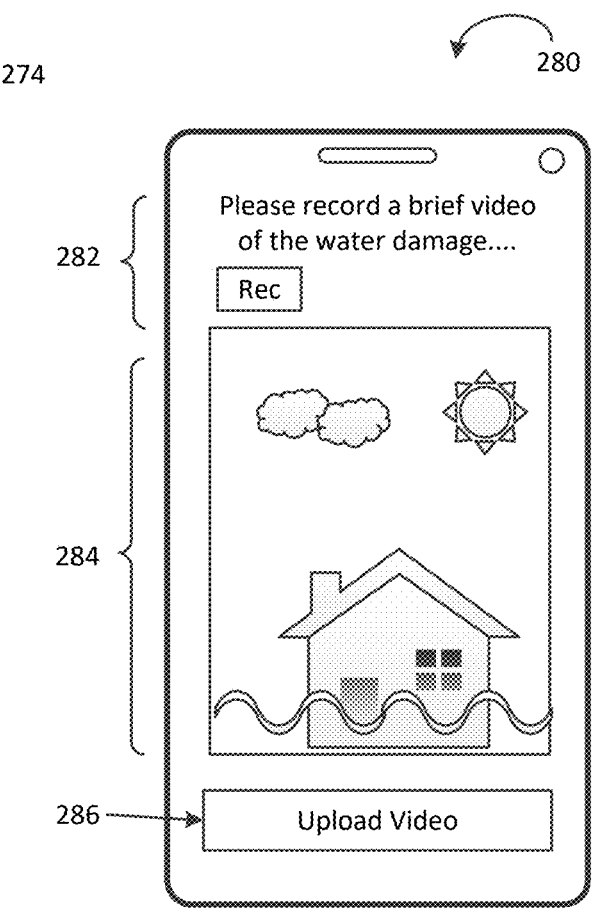

FIGS. 2C and 2D are example GUIs presenting interactive content for a user subsequent to a claim event, according to various examples. In various applications, the GUIs shown in FIGS. 2C and 2D may be comprised in a first notice of loss (FNOL) interface 270 (e.g., of a service application or website), and provides an intuitive and interactive gateway to configuring and sending insurance claims following claim events. Referring to FIG. 2C, an FNOL interface 270 can be accessed by the user 194 following a claim event, such as a catastrophic storm, flood, wildfire, vehicle incident, personal injury, etc. In various implementations, the computing system 100 can determine the type of event that has occurred in the user's location or home location and configure the FNOL interface presentation based on the event. For example, if a large rainstorm has just passed the user's home location, the initial screen of the FNOL interface can present selectable items that enable the user 194 to provide contextual information with regard to water damage, roof damage, damage from a falling object, vehicle damage, and the like.

According to examples described herein, the FNOL interface can present the initial screen to enable the user 197 to select from a plurality of common types of insurance claims. In the example shown in FIG. 2C, the user 194 is provided with a plurality selectable features 274 that, when selected, enable the user 194 to provide contextual information for water damage, damage from a falling object, theft of personal property, fire damage, and an "other" icon for additional types of insurance claims. Selection of the "other" icon can result in a secondary screen that presents a second tier of common types of insurance claims, such as personal injury, vehicle damage, etc.

Additionally or alternatively, the voice-AI engine 130 can make a call to the user 194 to obtain FNOL information following an event. In doing so, the voice communications between the user 194 and the voice-AI engine 130 can result in the computing system 100 obtaining all FNOL information or a portion of the FNOL information that can also be obtained through the user's interactions with the FNOL interface 270.

In the example shown in FIG. 2D, the user 194 has selected the water damage feature of the FNOL interface 270 of FIG. 2C, which enables the user 194 to provide contextual information regarding water damage to the user's home resulting from the claim event. In certain examples, the FNOL interface 280 can comprise multiple screens that enable the user 194 to provide text or audio description of the damage, record images and/or video of the damage, and provide estimates or receipts for repair or current repair costs. In the example of FIG. 2D, the FNOL interface 280 can include a prompt 282 that requests that the user 194 record a video that shows the damage. Accordingly, the FNOL interface 280 can include recording functions that access the computing device's camera and/or microphone, enabling the user 194 to record a video 284 or images of the claimed water damage, and an upload feature 286 that enables the user 194 to transmit the recorded video 284 to the computing system 100 for further analysis and claim processing.

As provided herein, the FNOL interface 280 show in FIG. 2D can be provided to the user 194 during or following a voice-AI call. In an example scenario, the voice-AI engine 130 can communicate to the user 194 to obtain initial FNOL information. In this scenario, the user 194 may indicate that flood damage has occurred on the user's property due to an experienced severe weather event. During or following the call session with the voice-AI engine 130, the computing system 100 can trigger the user's computing device 190 to generate the FNOL interface 280 shown in FIG. 2D. Thereafter, the user 194 can capture images or record video of damage caused by the severe weather event. It is contemplated that this dynamic interaction between the voice-AI engine 130, adaptive flow engine 125, and user computing device 190 can be performed for damage to the user's property, injuries, and/or vehicle.

Example Injury Interface

FIGS. 3A and 3B are example graphical user interfaces enabling a user to indicate injury following an injury event, according to various examples. In certain examples, the injury interfaces 300 shown in FIGS. 3A and 3B may be presented to the user 194 during an application session (e.g., native or browser), or during or following a call session with the voice-AI engine 130. In one example, the voice-AI engine 130 can contact the user 194 and ask whether the user 194 or anyone else has experienced injury resulting from a claim event, such as a vehicle incident, weather event, or other injury event. If the user 194 answers in the affirmative, then the voice-AI engine 130 can provide injury assistance with a combination of voice-AI and application features (e.g., via a browser application).

Referring to FIG. 3A, an injury interface 300 can be presented to the user 194 to enable the user 194 to indicate any injuries arising from the injury event. As provided herein, the injuries may be identified by the user 194 for the user's own injuries, or for the injuries of another party to the injury event. During a call session between the user 194 and the voice-AI engine 130, the voice-AI engine 130 may send a message or application link to the computing device 190 of the user 194, which when selected, can cause a native application or browser application to launch on the user's computing device 190 and present the injury interface 300 shown in FIGS. 3A and 3B. Alternatively, the user 194 may interact with the injury interface 300 subsequent to a call session with the voice-AI engine 130.

As shown in FIGS. 3A and 3B, an interactive human representation 333 is provided on the injury interface 300 to enable the user 194 to indicate the injuries by selecting one or more portions of the human representation 333. The human representation 333 can comprise a representation of a human body that allows the user 194 to indicate injury on the front, sides, or backside of the body and different portions of the human body. As shown in FIG. 3A, the human representation 333 enables the user 194 to select the mid and lower torso, hands and wrists, mid-arms, shoulders, upper torso, upper and lower back, upper legs, lower legs, ankles and feet, and head to indicate the injuries.

Referring to FIG. 3B, when the user 194 selects a portion of the human representation 333 (e.g., the torso), a set of options 327 is presented, which allows user 194 to provide input detailing the injury to the torso. This process can be repeated for each injury of each injured person, or can be performed by the user 194 for the user's own injuries. When the user 194 has detailed the injuries, the information provided can be included in the claim corpus of the claim file 112.

In alternative embodiments, the voice-AI engine 130 can automatically provide input on the injury interface 300 or otherwise include injury information in the claim corpus from the user's voiced description of injury. For example, instead of launching an application to present the user 194 with the injury interface 300, the voice-AI engine 130 can ask the user 194 to describe the location of each injury, the type of injury, and the severity of the injury. Accordingly, the information provided by the user 194 through input in FIGS. 3A and 3B may be obtained conversationally.

Example Damage Capture Interface

Figures 4A, 4B:
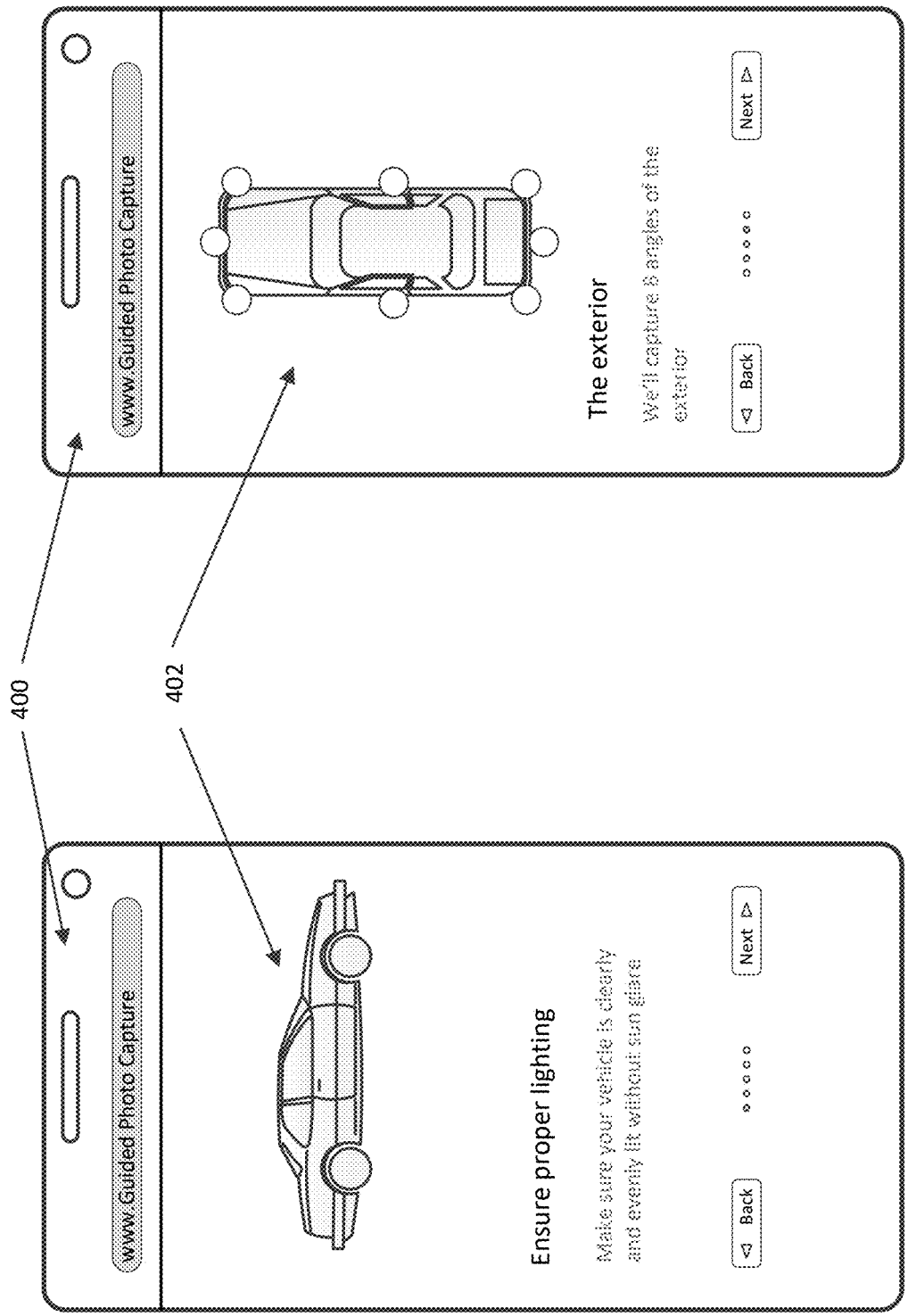
FIG. 4A through 4E illustrates an example graphical user interface providing guided photo capture for a user, in accordance with examples provided herein.

Referring to FIGS. 4A and 4B, when the computing device 400 of the user initiates guided content capture, a guided capture interface 402 is generated on the user's computing device 400. An initial set of screens or pages of the guided capture interface 402 can correspond to a tutorial that guides the user 194 to perform a set of steps to capture content corresponding to damage of the user's vehicle or property. As shown in FIGS. 4A and 4B, the guided capture interface 402 instructs the user 194 to ensure proper lighting and that the user 194 to capture certain angles of the exterior of the user's vehicle.

In various examples described herein, the guided capture interface 402 may be presented to the user 194 during an application session (e.g., via a browser application), or during a call session between the user 194 and the voice-AI engine 130. For example, the user 194 can indicate to the voice-AI engine 130 that vehicle damage has occurred due to a vehicle incident (e.g., collision or vehicle failure). The voice-AI engine 130 can send a message comprising a link (e.g., via text or email) that, when selected by the user 194, causes the guided capture interface 402 to be presented on the computing device 400 of the user 194 (e.g., via launch of a native or browser application). Thereafter, the user 194 can navigate through the individual pages of the guided capture interface 402 during or after the call session with the voice-AI engine 130.

Figures 4C, 4D:
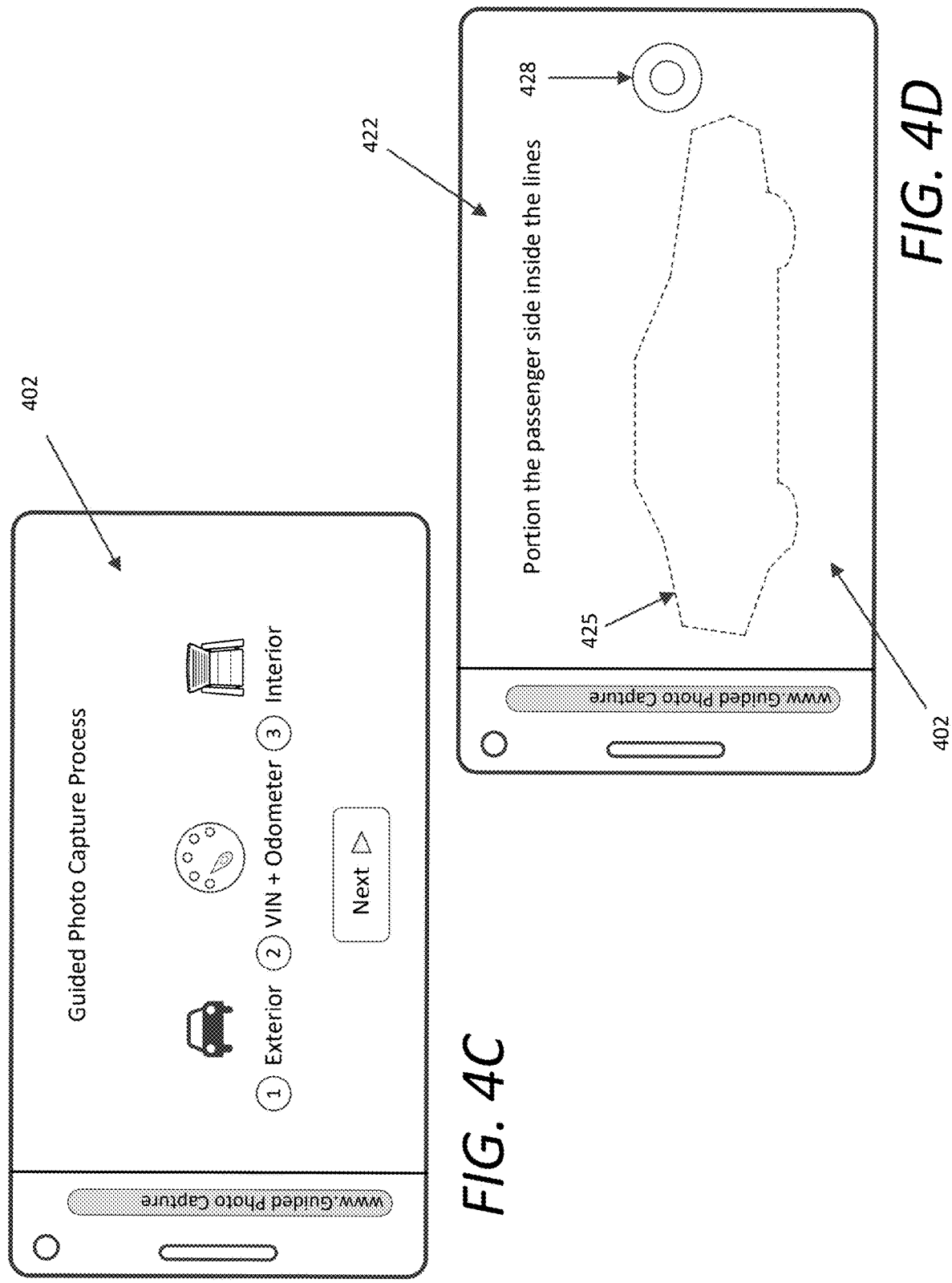

Referring to FIGS. 4C and 4D, the guided capture interface 402 can progress the tutorial to provide guidance to the user 194 in capturing the exterior of the vehicle, the vehicle identification number (VIN) and odometer, and the interior of the vehicle (if needed). As shown in FIG. 4D, the guided capture interface 402 generates a vehicle outline 425 and an optional content capture selector 428 that enables the user 194 to capture a photograph or video content of a specified angle of the vehicle. As described herein, the computing system 100 can perform a lookup of the user's vehicle, including the year, make, and model and generate the vehicle outline 425 based on this information.

In one example, an initial request by the guided capture interface 402 can comprise a request to capture the license plate number or VIN of the vehicle, after which the computing system 100 can perform optical character recognition (OCR) or computer vision techniques to detect the individual characters of the license plate or VIN, and perform a lookup in a vehicle database of the user's specific vehicle. Thereafter, the computing system 100 can generate the vehicle outline 425 for presentation on the guided capture interface 402. The guided capture interface 402 can also include guided text 422 that instructs the user 194 to capture a particular photograph or video content within the bounds of the vehicle outline 425.

Figure 4E:
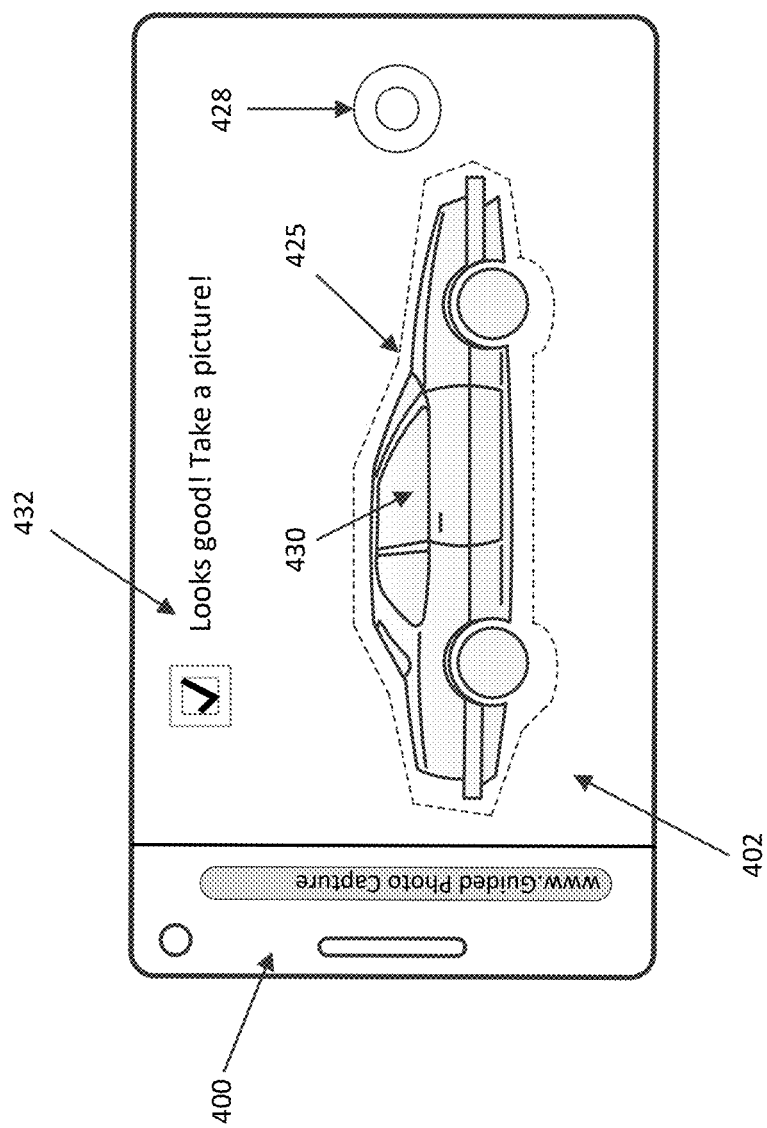

Referring to FIG. 4E, as the user 194 aligns the vehicle 430 within the vehicle outline 425, the backend computing system 100 can perform a computer vision, image analysis process to determine when the vehicle 430 is within the vehicle outline 425, and trigger an authorization or approval notification 432 (e.g., tint the interface 402 green and provide an approval message). In certain implementations, this trigger can also activate the content capture selector 428 to enable the user 194 to capture the vehicle 430. In variations, the trigger can automatically cause the user's computing device 400 to capture the photo or video content of the vehicle 430. As provided herein, the computing system 100 can generate vehicle outlines for each angle of the exterior of the vehicle 430 to be captured, and the computer vision techniques can trigger the authorization or approval notification 432 for each angle, or the computing system 100 can cause the camera of the user's computing device 400 to automatically capture the respective content for each particular angle. When all instructed content is captured and received by the computing system 100, the content can be included in the user's claim file 112, which comprises the entire corpus of information corresponding to the user's claim.

Example Collision Input Interface

Figures 5A, 5B:
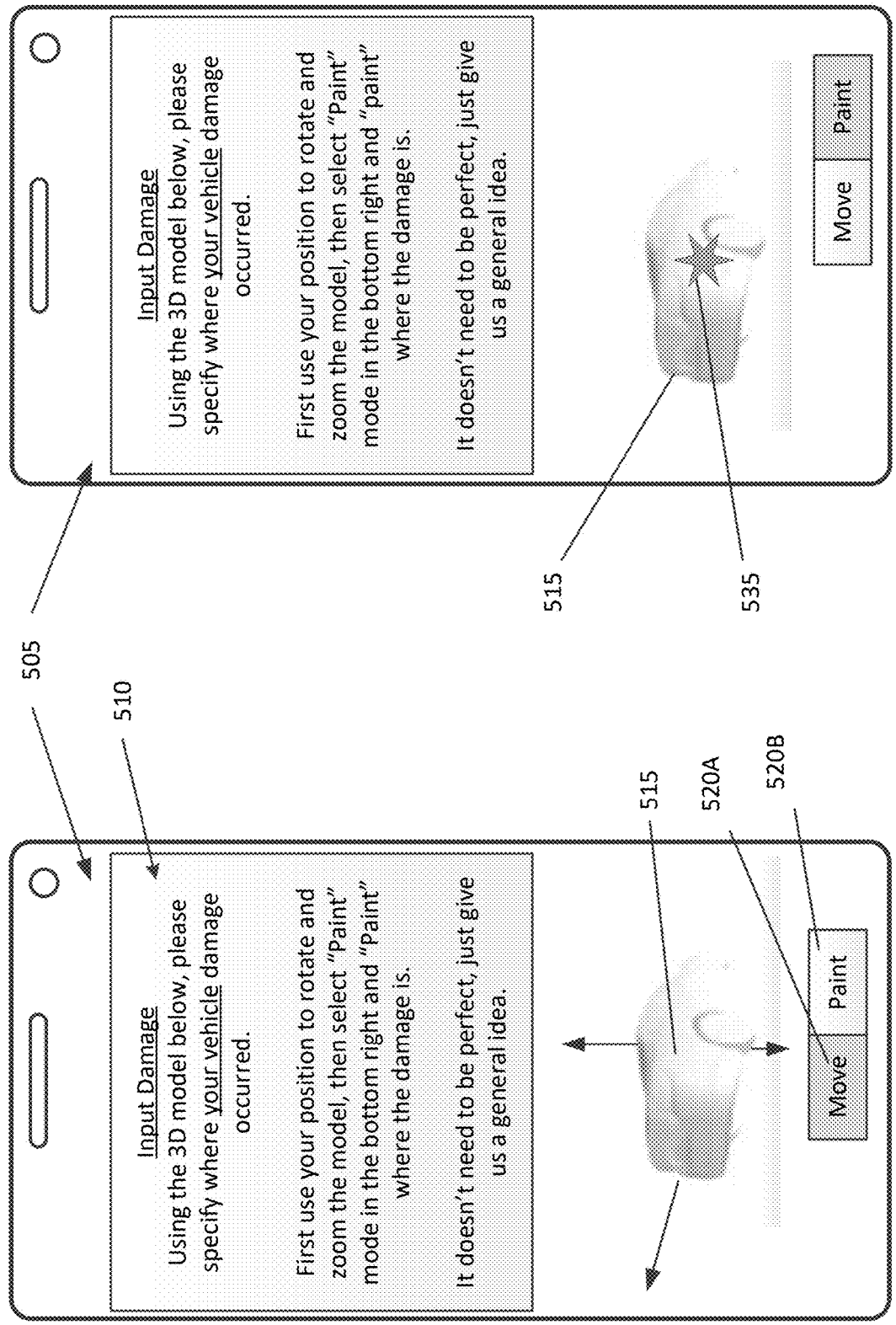
FIGS. 5A and 5B illustrate an example collision input interface enabling a user to indicate collision damage on a virtualized vehicle, according to example described herein.

FIGS. 5A and 5B illustrate an example collision interface 505 enabling a user to indicate collision damage on a virtualized vehicle, according to example described herein. In various examples, following a vehicle incident, the user 194 may be instructed to indicate damage to the vehicle using a three-dimension representation 515 of the user's vehicle. As described herein, the three-dimensional representation 515 can be generated based on the year, make, and model of the user's vehicle (e.g., as looked up in a vehicle database). The collision interface 505 can include instructions 510 to indicate vehicle damage, and the three-dimensional representation 515 can be rotated about a set of axes to enable the user 194 to indicate damage at any part of the vehicle's exterior.

In certain implementations, the user 194 can toggle between a "move" button 520A, which enables the user 194 to rotate the three-dimensional representation 515, and a "paint" button 520B, which enable the user 194 to indicate the location(s) 535 of damage on the vehicle. When the user 194 has finished indicating damage on the three-dimensional representation 515, the damage information indicated by the user 194 can be compiled with other damage information, such as captured content, witness and driver statements, police reports, medical information, injury information, and the like, within the claim file 112 of the user 194. As provided herein, the corpus of information compiled in the claim file 112 may be used as training data to train the various machine-learning models described throughout the present disclosure, and/or can be used to determine reserve estimates, total payout amounts or predicted settlement amounts, and the like.

According to examples described herein, the collision interface 505 may also be presented during a call session with the voice-AI engine 130. For example, the collision interface 505 be presented prior to, in conjunction with, or subsequent to the guided capture interfaces 402 of FIGS. 4A through 4E.

Example Collision Simulation Input Interface

Figure 6E:
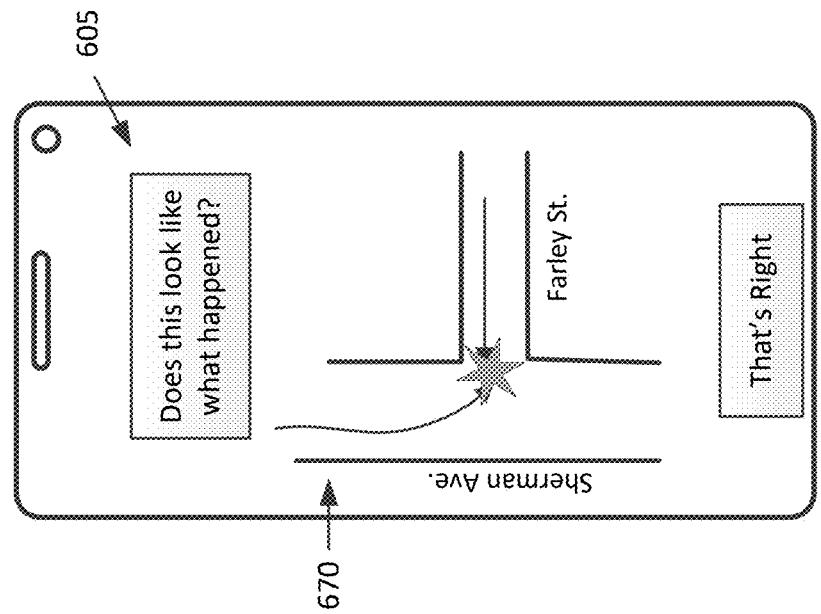
FIGS. 6A and 6E illustrate an example simulation input interface enabling a user to provide simulation inputs for a vehicle collision, according to various examples.

FIGS. 6A and 6E illustrate an example simulation input interface 605 enabling a user 194 to provide collision input, according to various examples. The collision simulation input interface 605 can be presented on the computing device 600 of a user 194 subsequent to a vehicle collision, and can enable the user 194 to provide input to indicate certain details of the collision, such as the trajectory of the vehicle(s) over satellite data or map data of as particular location of the vehicle incident, estimated speeds of each vehicle, and the like. As provided herein, the collision simulation input interface 605 can be presented during or subsequent to a voice-AI call between the user 194 and the voice-AI engine 130 (e.g., via a message link or in combination with the interfaces shown in FIGS. 4A-4D and 5A-5B). Referring to FIG. 6A, the collision interface 605 can request that the user 194 provide input to draw the path 607 of the user's vehicle on a map interface 609.

Figure 6D:
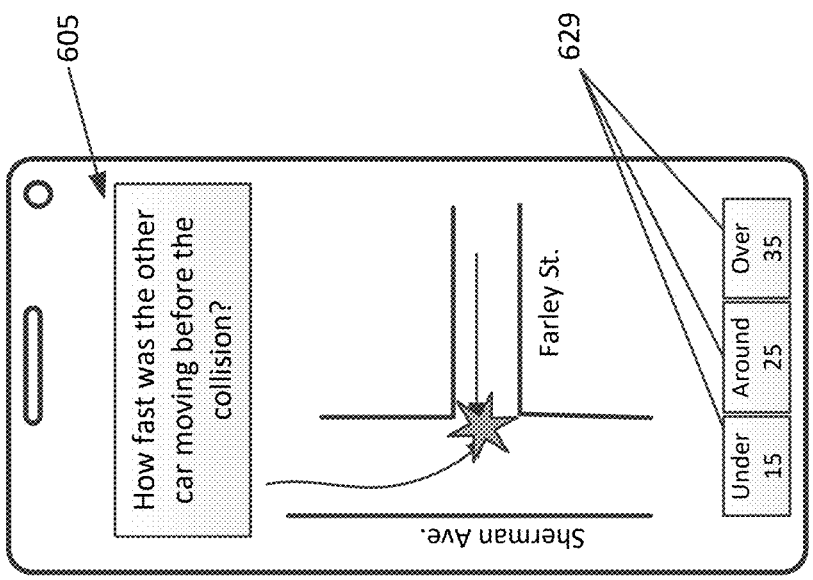

Referring to FIG. 6B, the collision interface 605 requests that the user 194 draw the path of the other vehicle 619 involved in the collision. Referring to FIGS. 6C and 6D, the user 194 is requested to indicate the estimated speeds of the user's vehicle and the other vehicle involved in the collision, and is provided with a set of options 629 to indicate the relative speeds of each vehicle. Referring to FIG. 6E, the computing system 100 can process the inputs provided by the user 194 to generate a simulation of the vehicle collision 670, and can query the user to indicate whether the simulation is accurate. In variations, other users and individuals that witnessed or were party to the vehicle collision may be presented with the collision interface 605 and can provide input to indicate what happened in the collision, including indicating the user's vehicle path, the other vehicle's path, and relative speeds.

In various examples, the computing system 100 can process all the inputs provided by the user 194 and/or other individuals via the collision interface 605 to generate the collision simulation 670, and may further determine whether the inputs provided by any of the individuals is inconsistent with the other individuals. In further examples, the computing system 100 can process the collision interface inputs along with witness statements, the user's statements, damage content, damage interface inputs, injury inputs, and the like, to generate the vehicle simulation. In generating the vehicle simulation, the computing system 100 can execute a physics engine that can utilize the damage of the vehicle(s) involved (e.g., as indicated in captured content) to adjust the simulation such that the user inputs on the collision interface 605 match the damage as shown in the captured content. While the vehicle collision shown in FIGS. 6A through 6E involves two vehicles, the embodiments described herein can process inputs provided for any number of vehicles, including any combination of a single vehicle collision, a single vehicle or multiple vehicles involving one or more pedestrians and/or cyclists, or a multiple vehicle collision.

Example Claimview Interface

Figure 7:
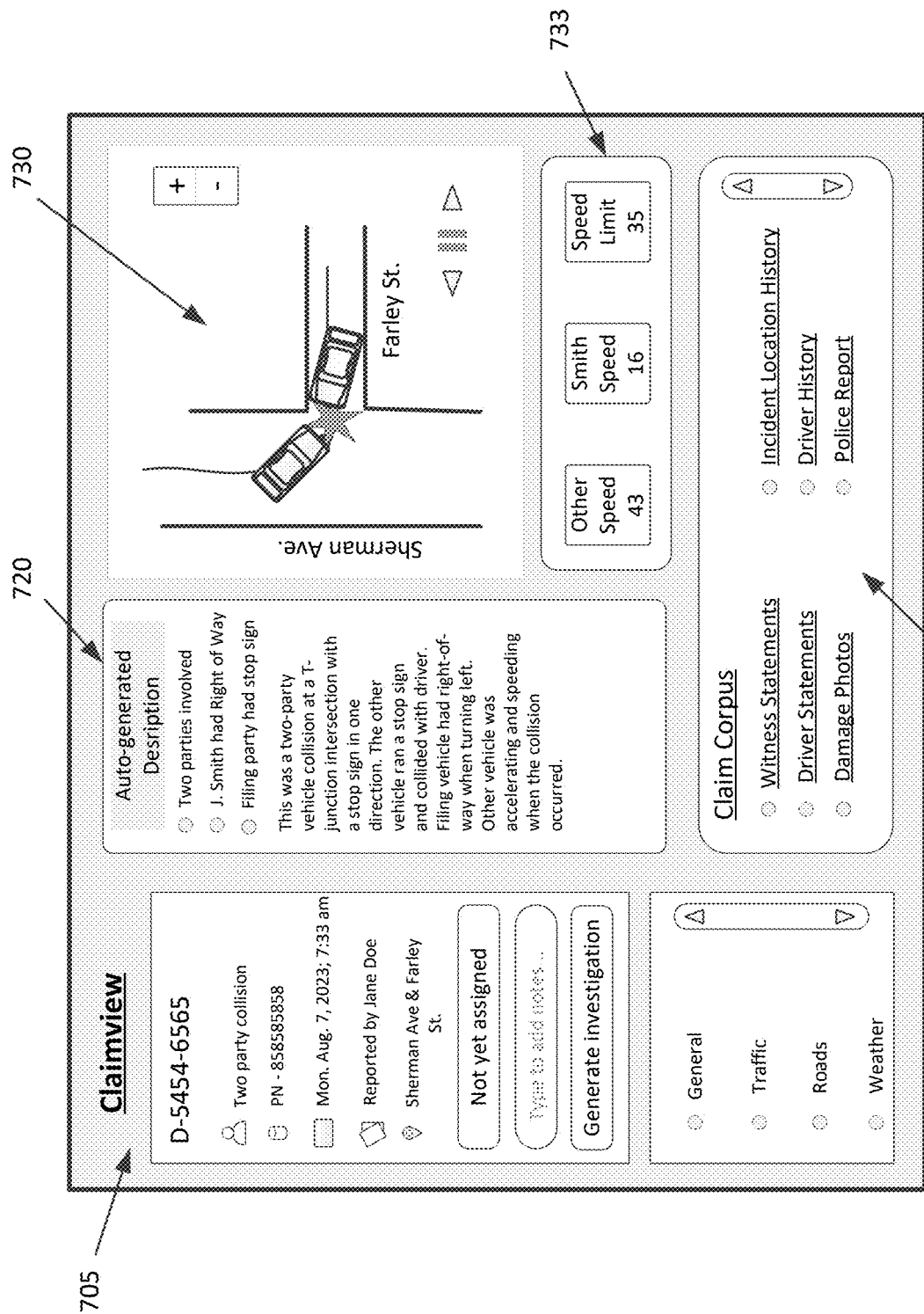
FIG. 7 illustrates an example collision reconstruction interface providing a large language model (LLM) summary of a collision event, according to various examples provided herein.

FIG. 7 illustrates an example collision reconstruction interface 705 providing a large language model (LLM) summary 720 of a collision event, according to various examples provided herein. Referring to FIG. 7, based the corpus of information corresponding to a claim event (e.g., a vehicle collision), the computing system 100 can generate a collision reconstruction interface 705 that includes all important aspects of the claim. In various implementations, the collision reconstruction interface 705 can include a simulation 730 of the vehicle collision, with contextual information 733 indicating the respective speeds of the vehicles, right-of-way rules, and/or road regulations at the collision location.

In various examples, the collision reconstruction interface 705 can also include links or scrollable data 736 to various portions of the corpus of information, which can include statements of the user 194, any passengers or witnesses, accident history at the collision location, accident history of the drivers and/or vehicles involved, damage content, police reports, and/or medical information corresponding to any injuries resulting from the collision. According to examples described herein, the collision reconstruction interface 705 can also include an LLM summary 720 of the vehicle collision, which is generated by a third-party LLM engine based on an AI prompt generated by the computing system 100. As described herein, the AI prompt can be automatically generated using the entire corpus of information in a particular claim file 112, and may be pre-processed based on quality information of the LLM engine, including adding synthetic facts, suppressing language that the LLM tends to focus on that is not relevant, and the like.

Upon receiving the LLM summary, the computing system 100 can perform post-language processing on the LLM summary, which can comprise a manual or automated process that deletes or otherwise edits the LLM summary 720 for the collision reconstruction interface 705. Thereafter, the computing system 100 can generate the collision reconstruction interface 705 to include the various information of the claim event for the purpose of expediting the claim process. This information can include policy number information, a claim identifier, contextual information for the claim, the collision simulation 730 and additional data 733, links to various additional information 736 obtained via the information gathering process, and the like. In various examples, the collision reconstruction interface 705 can be provided to a claims adjuster, investigator, policy provider, or the policy holder.

METHODOLOGY

In the descriptions of the various flow charts described below, reference may be made to reference characters representing various features as shown and described in connection with the previously described drawings. Furthermore, any step corresponding to the individual blocks described in the flow charts below may be performed prior to, in conjunction with, or subsequent to any other step in any other flow chart. Still further, the various steps represented by the blocks in the drawings may be performed by one or more modules or engines of the computing system 100, user device 190, combination of computing system 100, user device 190, and/or third-party resource 180 (e.g., a computing system executing an LLM 177), including via one or software applications or browser applications, as described herein.

Furthermore, described below are various methods of information gathering and communication using adaptive flow and voice-AI technology, which can be logic-based (e.g., using predetermined flows, sub-flows, questioning, etc.), learning-based (e.g., using internally trained ML models to dynamically adapt predetermined flows and generate new flows), and/or supported by an LLM 177 to generate dynamic scripting for voice-AI calls and/or provide AI-driven communications to the user 194 (e.g., text and content).

Figure 8:
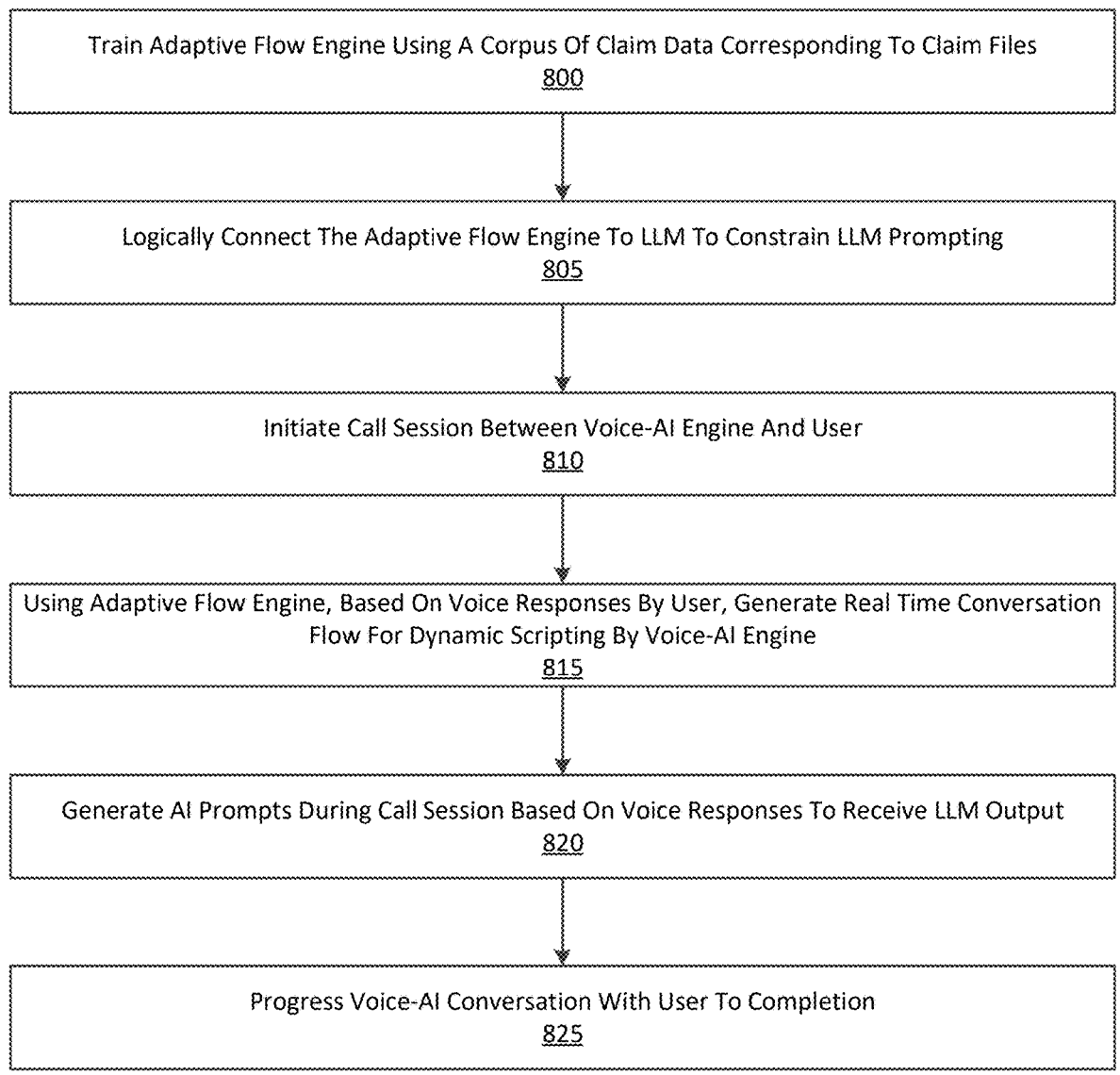
FIG. 8 is a flow chart describing a method of implementing an adaptive flow engine with a large language model (LLM) for communicating with users, according to various examples.

FIG. 8 is a flow chart describing a method of implementing an adaptive flow engine with a large language model (LLM) for communicating with users, according to various examples. Referring to FIG. 8, a computing system 100 can train an adaptive flow engine 125 using a corpus of historical claim data corresponding to the claim files 112 of any number of claims (800). As provided herein, the adaptive flow engine 125 can include a combination of logic-based rulesets and predetermined flows for obtaining information pertaining to a claim, one or more machine-learning models that can individualize communication methods for users 194 using engagement monitoring and adaptive flow techniques, and/or one or more predictive machine-learning models for performing supportive functions, such as detecting fraud, performing negotiations, providing injury assistance, and other automated investigative processes.

In various implementations, the computing system 100 can logically connect the adaptive flow engine 125 to an LLM 177 (e.g., executed by third-party computing resources 180 to constrain LLM prompting and LLM outputs (805). For example, each prompt to the LLM 177 can be filtered and pre-processed by the adaptive flow engine 125 to receive highly relevant LLM outputs for a claim process. Detailed description of LLM prompting and communications between an adaptive flow engine or dynamic content generator and LLM is provided in U.S. patent application Ser. No. 18/808,573, which is hereby incorporated by reference in its entirely. Further description is provided therein of the concept of a claim flow for a claim process, which can include any number sub-flows. These flows and sub-flow can be omitted, depending on relevance, or completed in a dynamic manner, such that depending on the nature of the communication between the computing system 100 and user 194, the adaptive flow engine 125 can jump between sub-flows in real-time, complete sub-flows or portions or sub-flows, and progress the claim process in a natural manner for the user 194. As provided herein, the text output from an LLM 177 can further be post-processed for relevance (e.g., edited and dynamically scripted) to provide the user 194 with text or voice-AI output in real time.

According to examples described herein, the computing system 100 can initiate a voice-AI call session between a voice-AI engine 130 and a user 194 pertaining to a claim process (810). Using the adaptive flow engine 125, the computing system 100 can generate real-time conversation flow for dynamic scripting by the voice-AI engine (815). In further examples, the adaptive flow engine 125 can provide the user 194 with a dynamic content flow that the user 194 can interact with to provide a description of the claim event, any statements or accounts of the claim event (e.g., who was at fault or a personal account of a severe weather event), record content (e.g., of damage, loss, or injury), and the like.

The adaptive flow engine 125 and voice-AI engine 130 can respond to the user's vocal outputs using adaptive and predetermined responses generated by the adaptive flow engine 125 and converted into voice output by the voice-AI engine 130. In certain situations, the user 194 may proceed to subject matter outside the boundaries of the adaptive flow engine 125, in which can the adaptive flow engine 125 can generate AI prompts during the call session, output the prompts to an external LLM 177, and receive an LLM output for each AI prompt (820). These LLM outputs may be post-processed for relevance to the current call session between the voice-AI engine 130 can user 194, and converted to voice-AI output to the user 194 in a conversational manner. Accordingly, in the manner described above, the computing system 100 can progress the voice-AI conversation with the user 194 to completion (825).

As provided herein, completion of a voice-AI session can comprise the completion of any information gathering flow or sub-flow of the adaptive flow engine 125. In various examples, the adaptive flow engine 125 and voice-AI engine 130 can utilize engagement monitoring techniques to optimize the communication flows with the user 194 in a customized and individualized manner (e.g., to maximize information gathering).

In various examples, the computing system 100 can generate one or more content flows for the user 194 to provide detailed information of the claim event. The communication flows can comprise customized content specific for the user 194, and can include specific user interface designs, font types, font sizes, and color schemes and themes, and can be accessed by the user via one or more specified communication methods (e.g., links to the content flows provided via text, phone calls, links to content flows provided via email, etc.). In various examples, the computing system 100 can execute a machine-learning engagement monitoring model to generate response data corresponding to the user's specific responses to content flows provided to the user 194

As provided herein, response data from the user 194 can identify content and communication methods that the user 194 responds to, such as links to customized content flows provided via email versus text message. The response data can further indicate which content designs (e.g., fonts, font sizes, themes, styles, etc.) for the content flows the user 194 that facilitates increased engagement by the user 194 versus which content designs the user 194 tends to ignore or provide less engagement. In certain implementations, the response data can further indicate a most effective cadence for communicating with the user 194, such as sending the user 194 communications during specified times of the day, and determining optimal times of the day and/or days of the week in which the user 194 is most likely to engage with a content flow. As further provided herein, the machine-learning engagement monitoring model may be executed for policy holders, witnesses to a claim event, victims of a claim event, claim filers, or any other party to a claim, and with the purpose of providing a customized user experience with the goal of maximizing information gathering pertaining to a particular claim.

Based on the response data specific to the user 194, the computing system 100 can generate a reminder strategy and communication strategy individualized to the user 194 for completing the claim process, including information gathering for a particular claim file 112. In various implementations, these strategies can comprise any combination of communication types (e.g., email, text, voice-AI, messenger app, content sharing app, etc.), cadence or timing of communication, and customized content for the user 194. As provided herein, the customized communication strategy can be implemented for each individual involved in a particular information gathering process, which can comprise any number of individuals that can provide useful information for a particular claim.

Figure 9:
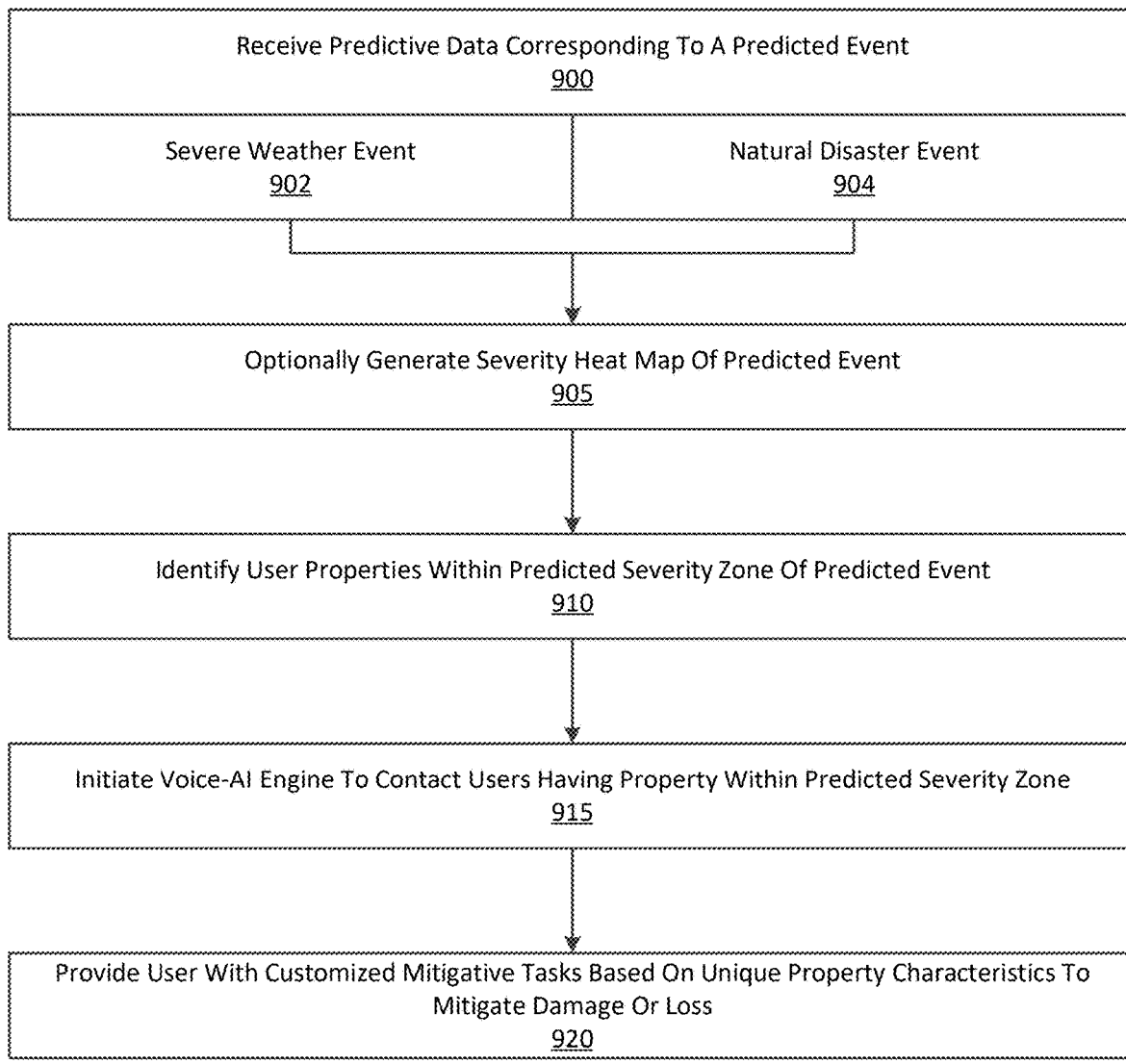
FIG. 9 is a flow chart describing a method of providing catastrophic event notification using voice-based artificial intelligence (AI) technology, according to examples described herein.

FIG. 9 is a flow chart describing a method of providing catastrophic event notification using voice-AI technology, according to examples described herein. Referring to FIG. 9, a computing system 100 can receive predictive data corresponding to a predicted event (900). The predicted event can comprise a severe weather event (902), or a natural disaster event (904). Optionally, based on the predictive data, the computing system 100 can generate a severity heat map of the predicted event (905). As described herein, the predicted event can comprise a predicted hurricane, flood, wildfire, earthquake, tornado, hailstorm, drought, landslide, volcanic eruption, and the like. The severity hap map can indicate the relative impact of such a predicted event in highly localized areas of a region predicted to be impacted by the event.

In various implementations, the computing system 100 can identify user properties within the predicted severity zone of the predicted event (910). This zone can be correlated to the severity heat map, and can involve the path of a storm (e.g., hurricane or tornado), a high risk area of a wildfire (e.g., a forecasted downwind area), and flood area, and the like. In certain examples, the computing system 100 can identify these properties and contact information of the users 194 by performing a lookup of the users' homeowner's insurance policies, or other insurance policies. Alternatively, the computing system 100 can identify the users from a profile database comprising user profile 114 in a database 110.

According to examples described herein, the computing system 100 can initiate a voice-AI engine 130 to contact the users 194 (e.g., via voice-AI phone calls) having property within the predicted severity zone (915). In these voice-AI calls, the voice-AI engine 130 can provide synthetic vocal warnings to the users 194, provide them with specific threats to their properties arising from the predicted event, and can further provide them with recommended actions for mitigating or preventing damage arising from the predicted event. In certain examples, the computing system 100 can further provide the user 194 with customize mitigative tasks based on the unique property characteristics of the user's property to mitigate damage or loss (920).

Figure 10:
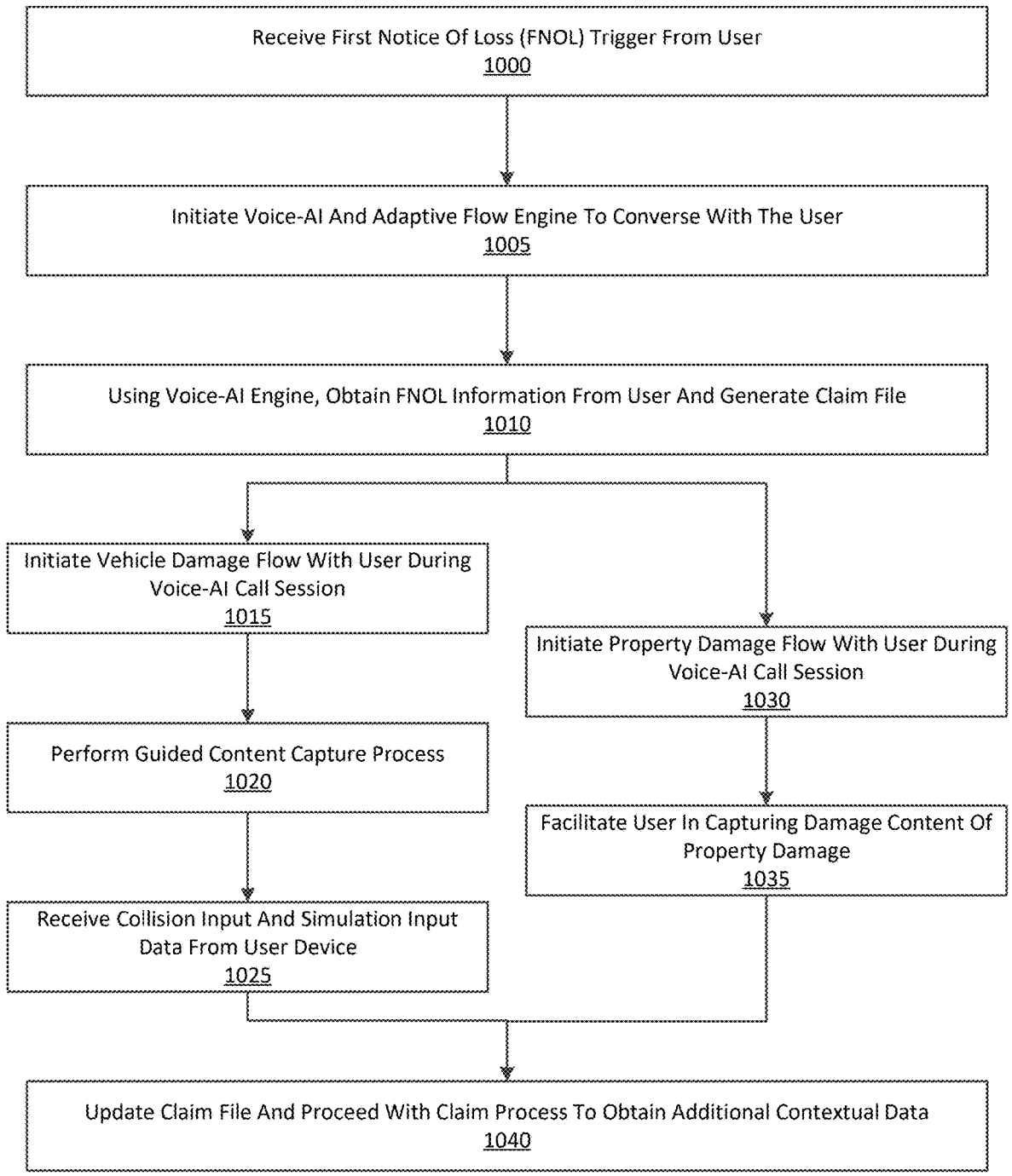
FIG. 10 is a flow chart describing a method of implementing voice-based artificial intelligence (AI) in connection with a first notice of loss (FNOL) trigger, according to examples described herein.

FIG. 10 is a flow chart describing a method of implementing voice-based artificial intelligence (AI) in connection with a first notice of loss (FNOL) trigger, according to examples described herein. Referring to FIG. 10, a computing system 100 can receive a first notice of loss (FNOL) trigger from a computing device 190 of a user 194 (1000). In certain implementations, the computing system 100 can initiate a voice-AI engine 130 and adaptive flow engine 125 to converse with the user (1005). Using the voice-AI engine 130, the computing system 100 can obtain FNOL information from the user 194 and generate a claim file 112 (1010).

For vehicle incidents, the adaptive flow engine 125 can initiate a vehicle damage flow with the user 194 during the voice-AI session (1015). In this process, the adaptive flow engine 125 can instruct the voice-AI engine 130 to ask a series of questions to obtain contextual information about the vehicle incident. Furthermore, during or after the voice-AI session, the adaptive flow engine 125 can communicate with the computing device 190 of the user 194 (e.g., via text message or email link) to perform a guided content capture process to obtain photos and or video of the damage to the vehicle (1020). In further examples, the adaptive flow engine 125 can facilitate a collusion input and collision simulation input process or obtain collision data from the user device 190 (1025). For example, the user 194 may be presented with a collision IQ interface and/or collision simulation input interface to gather more contextual information of the vehicle incident.

For property damage, the adaptive flow engine 125 can initiate a property damage flow with the user 194 during the voice-AI call session (1030). During this session, the user 194 may be asked a series of questions about the nature and severity of damage to the user's property. In further examples, the adaptive flow engine 125 can facilitate the user 194 in capturing content (e.g., photos and video) of the damage to the user's property (1035). For example, the adaptive flow engine 125 can transmit a link (e.g., via text message or email) to the user's device 190, which when selected can cause a browser application to launch and enable the user 194 to capture images and video of the damage. This data can be automatically uploaded to the user's claim file 112.

In either case of vehicle or property damage, the computing system 100 can generate and updated the user's claim file 112, and process with the claim process to obtain additional contextual information corresponding to the claim event (1040). As discussed in the below flow charts, the computing system 100 can progress through respective information-gathering flows to contact other individuals, achieve a network effect of information-gathering, and progress the claim process to completion.

Figure 11:
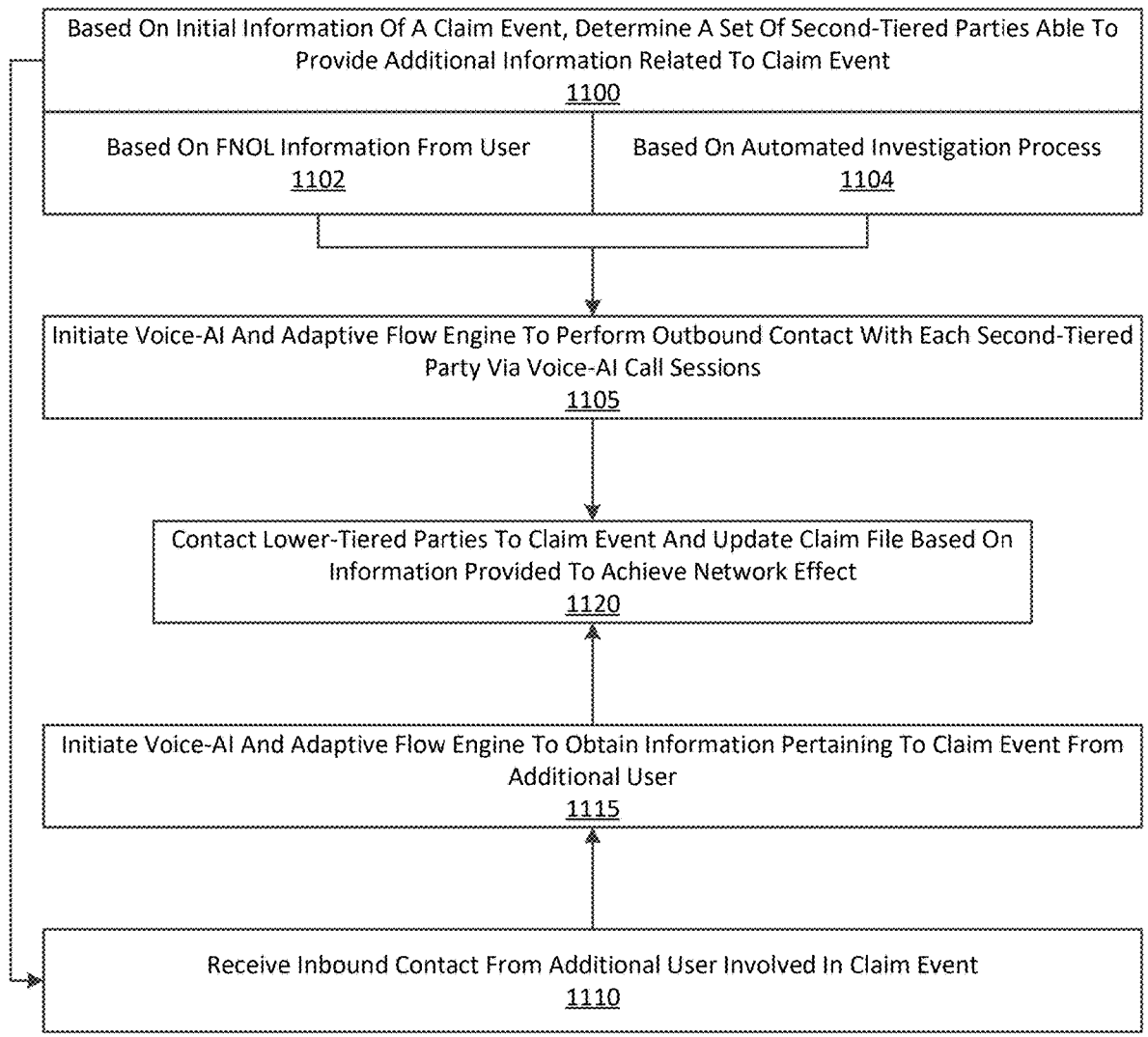
FIG. 11 is a flow chart describing a method of initiating first contact with additional parties connected to a claim event using voice-AI technology, according to various examples.

FIG. 11 is a flow chart describing a method of initiating first contact with additional parties connected to a claim event using voice-AI technology, according to various examples. Referring to FIG. 11, based on initial information of a claim event (e.g., provided in a FNOL session or from an initial claim filing), the computing system 100 can determine a set of second-tiered parties able to provide additional information related to the claim event (1100). As provided herein, these parties can be mentioned in an FNOL process, or may be determined by the computing system 100 through lookups in user profiles 114 policy information, and the like. As further provided herein, the parties can comprise family members to the user 194, witnesses, adverse parties, police officers that responded to the claim event, experts, neighbors, and anyone else who can provide contextual information of the claim event. These second-tiered parties can comprise a next set of individuals discovered automatically by the computing system 100 or mentioned by the user 194. As discussed below, additional tiered parties or individuals can further be mentioned or discovered, and the process may cascade until all individuals able to provide information pertaining to the claim event are identified and contacted. These individuals may be identified based on the FNOL information provided by the user 194 (1102), or may be identified automatically by the computing system 100 through an automated investigation process (1104).

In certain aspects, the computing system 100 can initiate a voice-AI engine 130 and adaptive flow engine 125 to perform outbound contact with each second-tiered party via voice-AI call sessions (1105). In certain scenarios, the computing system 100 may receive inbound contacts (e.g., phone calls) for additional users 194 involved or otherwise associated with the claim event (1110). For inbound contacts, the computing system 100 can also initiate the voice-AI engine 130 and adaptive flow engine 125 to obtain information pertaining to the claim event from these inbound callers (1115). For either outbound or inbound voice-AI sessions, the computing system 100 can obtain information corresponding to additional individuals relevant to the claim event (i.e., lower tiered contacts), to achieve a network effect of information gathering and update the claim file 112 based on the information provided (1120).

Figure 12:
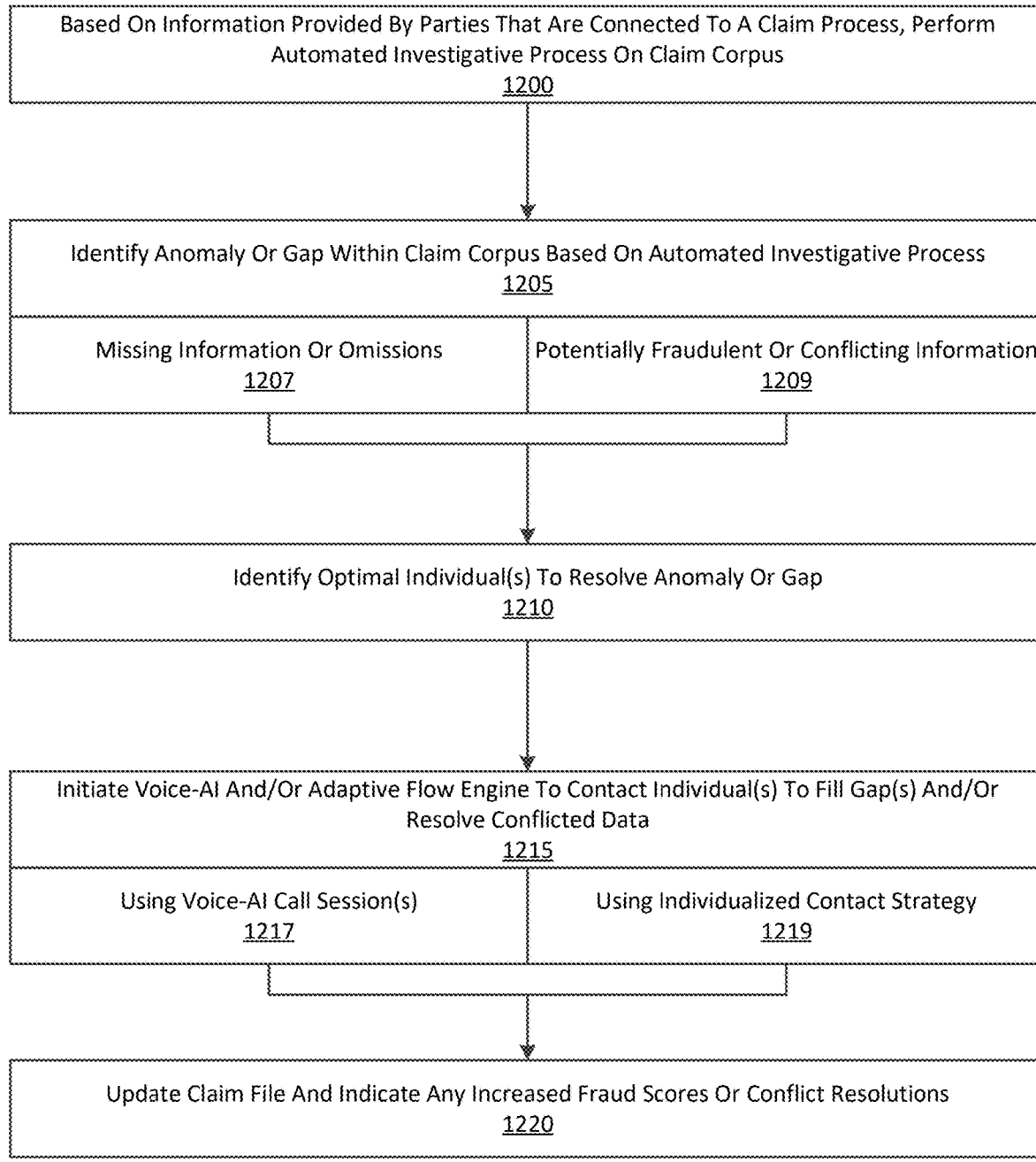
FIG. 12 is a flow chart describing a method of downstream information gathering utilizing voice-AI and/or other AI contact methods, according to various examples.

FIG. 12 is a flow chart describing a method of downstream information gathering utilizing voice-AI and/or other AI contact methods, according to various examples. Referring to FIG. 12, the computing system 100 can perform an automated investigative process on the claim corpus based on information provided by parties connected to an information-gathering process for a claim (1200). During the automated investigative process, the computing system 100 can identify an anomaly (e.g., fraudulent or conflicting information) or a gap within the claim corpus of a particular claim file (1205).

In various examples, the anomaly or gap in the claim file 112 can involve missing or omitted information, such as an unmentioned detail of the claim event (e.g., a vehicle make and model involved in a collision, demographic information, an address, a hospital record, a contractor statement, etc.) (1207). Additionally or alternatively, the anomaly or gap in the claim file 112 can comprise potentially fraudulent or conflicting information that may require further investigation (1209). In various cases, the computing system 100 can automatically identify optimal individuals to resolve the anomaly or gap in the claim file 112 (1210). As provided herein, this can comprise any downstream task from the initial claim filing, first contact with parties to the claim event, and any additional parties that facilitated the computing system 100 in achieving a network effect of information-gathering. Thus, these optimal individuals may be individuals already contacted, or can be new parties to the claim file 112 that may fill in any gaps or resolve any conflicting information (e.g., corroborate one set of statements versus a potential fraudulent statement).

For example, the computing system 100 can receive information for a user 194 identifying one or more individuals to provide additional information for a claim process. As an example, a vehicle collision involving three vehicles having a total of nine occupants, having been witnessed by twenty individuals, can involve vehicle damage and injuries. The injuries may be attended to by multiple paramedics and the collision may result in a police report. In certain implementations, the computing system 100 can detect one of the individuals involved in the vehicle collision initiate a claim process, which can trigger the computing system 100 to identify one or more of the individuals involved (e.g., as identified by the initiator or any other individual involved in the incident). The computing system 100 can initiate first contact with the individual(s) identified by the initiator, who can also identify other individuals involved in the incident until each of the nine vehicle occupants and the twenty witnesses are identified. In certain examples, the paramedics, police officers, emergency response people, firefighters, etc. can also be identified and contacted by the computing system 100. Accordingly, the computing system 100 can initiate first contact with each individual named by the initiator and each of the contacted individuals to complete the claim process.

In various examples, the computing system 100 can perform engagement monitoring and individualized reminder strategy techniques for each individual, and can induce a network effect in which information gathering from the initiator and those identified by the initiator can cascade until everyone or almost everyone that can provide valuable information for the claim event is contacted and performs their individual information gathering processes. In certain implementations, the computing system 100 can perform claim corroboration techniques to identify whether one or more of the individuals are provide information that is inconsistent with the majority of the individuals (e.g., which can amount to evidence of fraud), or to determine the correct narrative or verified facts for the claim event.

In various examples, when a particular threshold is met, the computing system 100 can finalize the information gathering process and generate an AI prompt to receive an LLM summary of the claim event. The threshold can correspond to each of the identified individuals being contacted and completing their individual information gathering processes (e.g., through customized content flows and reminder strategies and/or voice-AI calls), or can correspond to a final state of the claim process. The final state of the claim process can comprise a state in which all individuals identified have been contacted, and a set of the individuals have completed their information gathering processes while computing system 100 is unsuccessful in inducing others from completing theirs. As provided herein, the computing system 100 can then generate a claimview interface or collision reconstruction interface that includes the LLM summary. In certain examples, the claimview interface or collision reconstruction interface can include a simulation of the vehicle collision and can be provided to the user 194, a policy provider of the user 194, or a claim investigator.

In further examples, the computing system 100 can the initiate voice-AI engine 130 and/or adaptive flow engine 125 to contact these optimal individuals to fill gaps and/or resolve conflicting data (1215). This can be performed using voice-AI call sessions (1217), or using individualized contact strategies for those specific individuals, as described herein (1219). Once the gaps have been filled and anomalies resolved, the computing system 100 can update the claim file and indicate any increased fraud scores or conflict resolutions (e.g., for a final claimview report) (1220).

Figure 13:
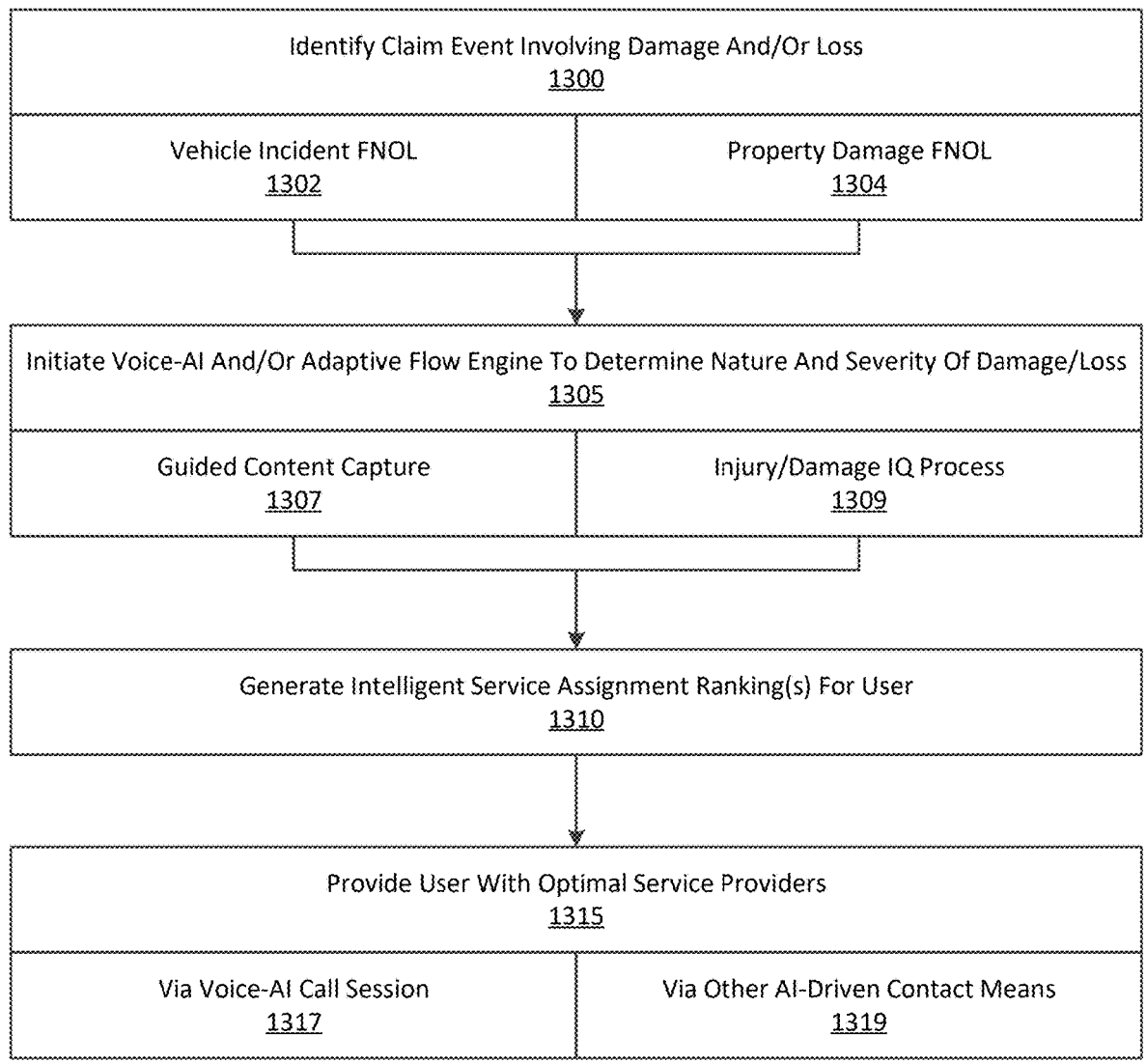
FIG. 13 is a flow chart describing a method of implementing intelligent service assignment using combined voice-AI and adaptive content flows, according to certain implementations.

FIG. 13 is a flow chart describing a method of implementing intelligent service assignment using combined voice-AI and adaptive content, according to certain implementations. In various examples, service providers can be employed to make repairs, renovations, or otherwise provided services to a user 194 that has experienced a claim event. The service providers can comprise any organization, business, or individual that provides any service in connection with vehicles or property, and can include towing service entities, automotive repair services, home repair services (e.g., flood damage repair, fire damage repair, smoke damage repair, builders, roofers, flooring specialists, appliance specialists), vehicle rental agencies, salvage yards, junk yards, and the like. Referring to FIG. 13, the computing system can identify a claim event involving damage and/or loss (1300). For example, the computing system 100 can receive incident information corresponding to a vehicle incident, such as a vehicle collision or breakdown via a vehicle incident FNOL session (1302). Alternatively, the computing system 100 can receive incident information via a property damage FNOL process (1304).

In some scenarios, the incident information can be received via one or more statements from people involved in the incident (e.g., via call session(s) or application session(s)). Additionally or alternatively, the incident information can be receive via captured content (e.g., at the accident scene or tow yard). In various examples, the computing system 100 can execute a trained machine-learning model to process the incident information and user information of the user 194. In doing so, the trained machine learning model can output a prediction and/or determination of damage to the user's vehicle or property.

In addition, the computing system can initiate a voice-AI engine 130 and adaptive flow engine 125 to communicate with the user 194 and determine the nature and severity of the damage or loss (1305). These voice-AI communications can be performed in conjunction with guided content capture processes (1307) and/or injury or damage IQ input processes (e.g., either during or after the voice-AI session) (1309). In further examples, the computing system can output a prediction and/or determination of a set of services providers for the user 194. Based on a set of parameters, the computing system 100 can generate intelligent service provider rankings of service providers to service the vehicle or property for the user 194 (1310). In some aspects, the prediction of the damage can be based on damage inputted by the user 194 and/or captured via the user's computing device, and can comprise an automated determination of whether the user's vehicle or property is repairable, which parts are likely to need replacement or repair, damage repair costs, and the like. In further aspects, the prediction of the service providers to service the vehicle or property for the user 194 can comprise an optimization based on any combination of the set of parameters, which can include service provider locations in relation to the user's home or incident location, public reviews or ratings of the service providers, service provider qualifications and/or certificates, service provider costs, and/or service provider quality, and/or predicted user preferences based on user-specifics (e.g., based on user preferences for repair quality, the user's vehicle, cost, and/or distance, or demographic information and/or user's net worth or income, etc.).

Based on the set of optimizations, the computing system 100 can provide the ranked list(s) of service providers to the user 194 to facilitate service of the damaged vehicle or property for the user 194 (1315). In certain examples, the computing system 100 can provide a ranked list of service providers for each particular service needed for the user 194, such as a ranked list of towing services, body repair shops, mechanics, drive train repair shops, dent repair shops, etc. In certain examples, the computing system 100 can provide the service provider rankings or assignments to the user 194 via a voice-AI call session (1317), or via other AI-driver mean, such as text or email (1319). Optionally, the computing system 100 can also automatically coordinate and/or schedule the service(s) for the user 194 to rectify the vehicle incident. For example, the computing system 100 can send a message to the user's computing device 190 to authorize automated service scheduling. If the user 194 agrees, the computing system 100 can automatically coordinate the necessary services for the user 194.

Figure 14:
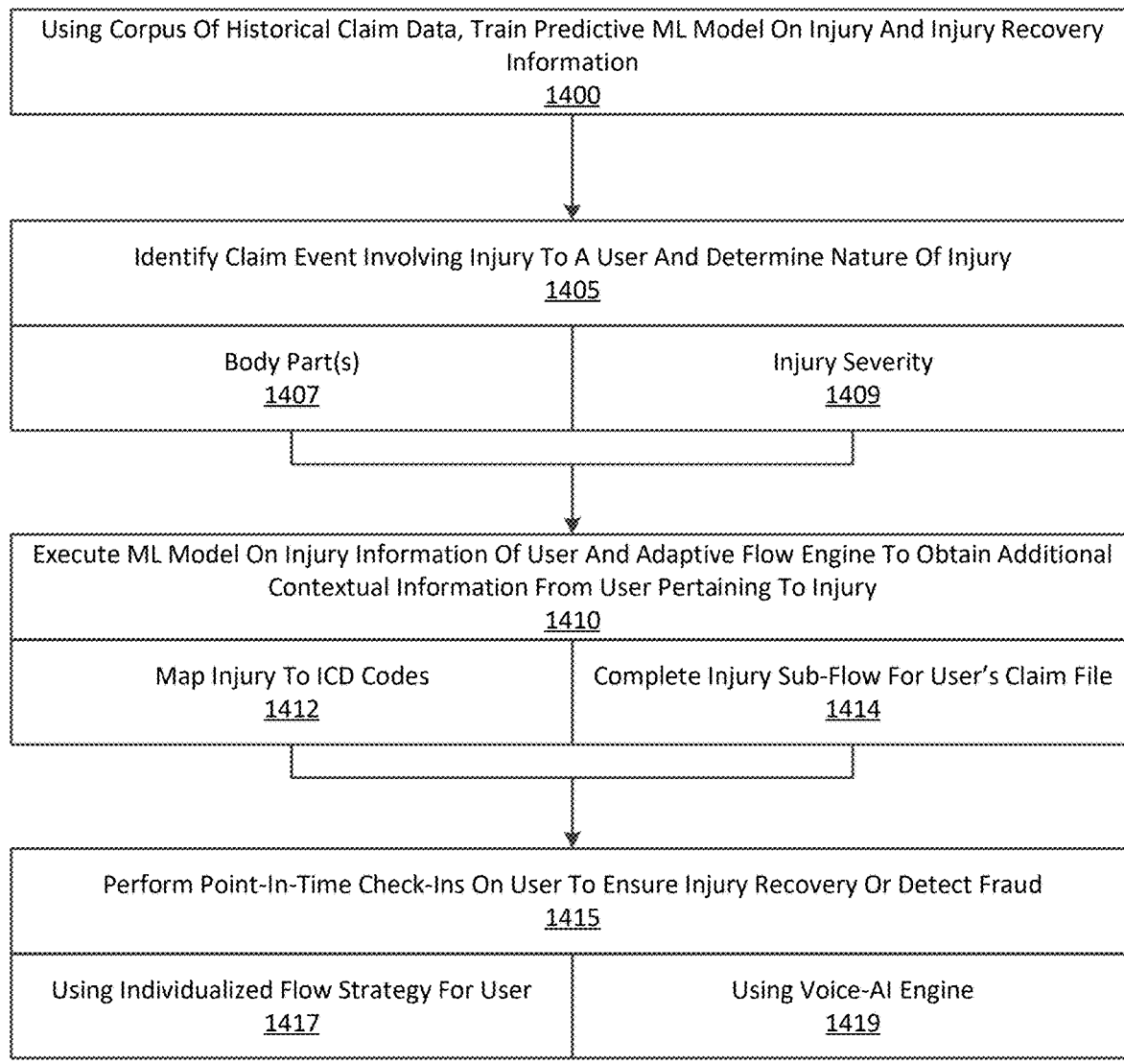
FIG. 14 is a flow chart describing a method of providing injury assistance to a user using voice-AI technology, according to examples described herein.

FIG. 14 is a flow chart describing a method of providing injury assistance to a user using voice-AI technology, according to examples described herein. Referring to FIG. 14, the computing system 100 can train a machine learning injury assistance model using a corpus of historical claim data and injury recovery information to provide individualized injury assistance to users 194 involved in injury events (1400). In this training phase, the computing system 100 can implement a big data technique to obtain claim files and or injury records of injury events and injuries to train the machine learning model. In further examples, the computing system 100 can also use demographic information of injure individuals and users 194, such as age information, gender or sex information, home location information, etc. to train the machine learning model. In still further examples, the computing system 100 can use finalized settlement data, comprising settlement offers and amounts in previous claim files 112 to train the machine learning model. It is contemplated that the information obtained to train the machine learning model can provide the model with predictive capabilities in aiding users 194 in the healing process for their injuries.

In various examples, the computing system 100 can identify a claim event identifying an injury to a user 194, and determine the nature of the injury, such as via a claim filing or FNOL filing, vehicle incident, or generally any injury event (1405). For example, the computing system 100 can identify which body part(s) of the user 194 are injured (1407), and further determine the severity of injury to each body part (1409). The computing system 100 can initiate the trained machine learning injury assistance model (e.g., corresponding to the injury assistance module 140 of FIG. 1) for the user 194 to provide injury assistance to the user 194.

In certain examples, as the machine learning injury assistance model provides assistance to the user 194 over the healing period, the model can generate a claim hub for the user 194 to facilitate claim tracking. The claim hub can provide the user 194 with updates to the claim process, reminders to complete certain portions of the claim process, enable an in-line chat interface for the user 194, and enable document processing for the user 194. This can enable the user 194 to interact with a chatbot to determine the current state of the claim process (e.g., driven by the voice-AI engine 130), determine if any other documentation or information gathering is needed (or if the user 194 is requested to e-sign a document), and provide the user 194 with quick and easy features to provide updated information corresponding to the user's injuries.

In certain examples, the injury assistance model can further perform point-in-time check-ins for the user 194 (e.g., via voice-AI calls), which can ask the user 194 periodically for an update (e.g., "how is your knee injury healing?"). In certain implementations, the injury assistance model can be executed by the adaptive flow engine 125 and voice-AI engine 130 to engage with the user 194 using individualized reminder strategies, customized content, contact methods (e.g., email, text, automated phone call, etc.), or via application notifications. Based on the user's responses, the injury assistance model can verify the updates provided by the user 194 using medical data accessed by the model. In doing so, the injury assistance model can verify recovery update information provided by the user 194 by accessing medical data of the user 194 and verifying whether the recovery update information matches the medical data. For example, if the user 194 states that an injury is nearly healed and stitches have been removed, the injury assistance model can access the user's medical records to confirm that this is indeed the case. Alternatively, if the user 194, for whatever reason, is dishonest about a particular injury, the injury assistance model can perform fraud detection techniques described herein. In further examples, the injury assistance model can further perform automated scheduling for the user 194, such as synching with the user's calendar application to automatically schedule medical or physical therapy appointments to ensure that the user 194 heals from the injuries.

In various implementations, the injury assistance module 140 can execute the trained machine learning model on injury information of the user 194, and can further execute the adaptive flow engine 125 to obtain additional contextual information from the user 194 pertaining to the injury (1410). This step may be performed through one or more messaging sessions, voice-AI call sessions, or application sessions. In certain examples, the injury assistance module 140 can map the user's injury or injuries to ICD codes (e.g., the latest version of the Internation Classification or Diseases) (1412). For example, the injury assistance module 140 can be trained to determine injuries based on ICD code, and typical healing timelines based on factors such as injury severity, age and gender of the patient, genetic information of the patient, other health factors (e.g., obesity, athleticism, weight, other diseases or combinations of injuries, etc.). In further examples, the injury assistance module 140 can be trained to identify a specified injury and its severity, match the injury to an ICD code, and determine, based on the user's personal information, such as age, gender, and other health information, a typical healing timeline for the user 194.

Additionally, an injury sub-flow of the adaptive flow engine's overall claim processing flow can be completed through one or more communication sessions with the user 194 for the user's claim file 112 (1414). The communication sessions can be any combination of application session, voice-AI call session, or messaging session. In one example, the voice-AI engine 130 can call the user's computing device 190, and can progress through the injury sub-flow, obtaining voiced information from the user 194, and/or providing message links to the user, which when selected causes a browser application to present the injury IQ interfaces described herein. This enables the user 194, during the voice-AI call session, to provide input indicating specifics of the user's injury.

According to examples described herein, the computing system 100 can further perform point-in-time check-ins on the user 194 to ensure that the user 194 is recovering, achieves a state of stability, or detect fraud in the user's injury (1415). For example, when the computing system 100 performs point-in-time check-ins with the user 194, the system 100 may determine whether a claimed recovery of the user 194 diverges from a predicted recovery timeline determined by the trained machine learning model (e.g., by a threshold amount). If a divergence exceeds this threshold, the computing system 100 can flag the claimed recovery of the user 194 as potentially fraudulent. As described herein, the point-in-time check-ins can be performed using the individualized flow strategy generated for the user 194 by the adaptive flow engine 125 (e.g., using engagement monitoring techniques) (1417). For example, the user's individualized reminder strategy and communication strategy may be employed by the adaptive flow engine 125 to perform these check-ins. Additionally or alternatively, the computing system 100 can utilize the voice-AI engine 130 to perform these check-ins (1419).

It is contemplated that the injury assistance techniques described throughout the present disclosure can contribute to a more efficient insurance and health care regime that promotes recovery care and, overall, a more health user base. Furthermore, the injury assistance techniques can perform verification and/or fraud detection tasks such that the industry as a whole moves towards greater vigilance and efficiency, which can have the effect of reducing costs in terms of both insurance and medical care. In certain implementations, the computing system 100 can further process the information in the claim corpus and injury assistance process to generate an individualized settlement offer for the user 194. This settlement offer can be generated based on industry standards, reserved estimate, rulesets, historical offers, acceptance and rejection data, user-specific information of the user 194, and the like.

Figure 15:
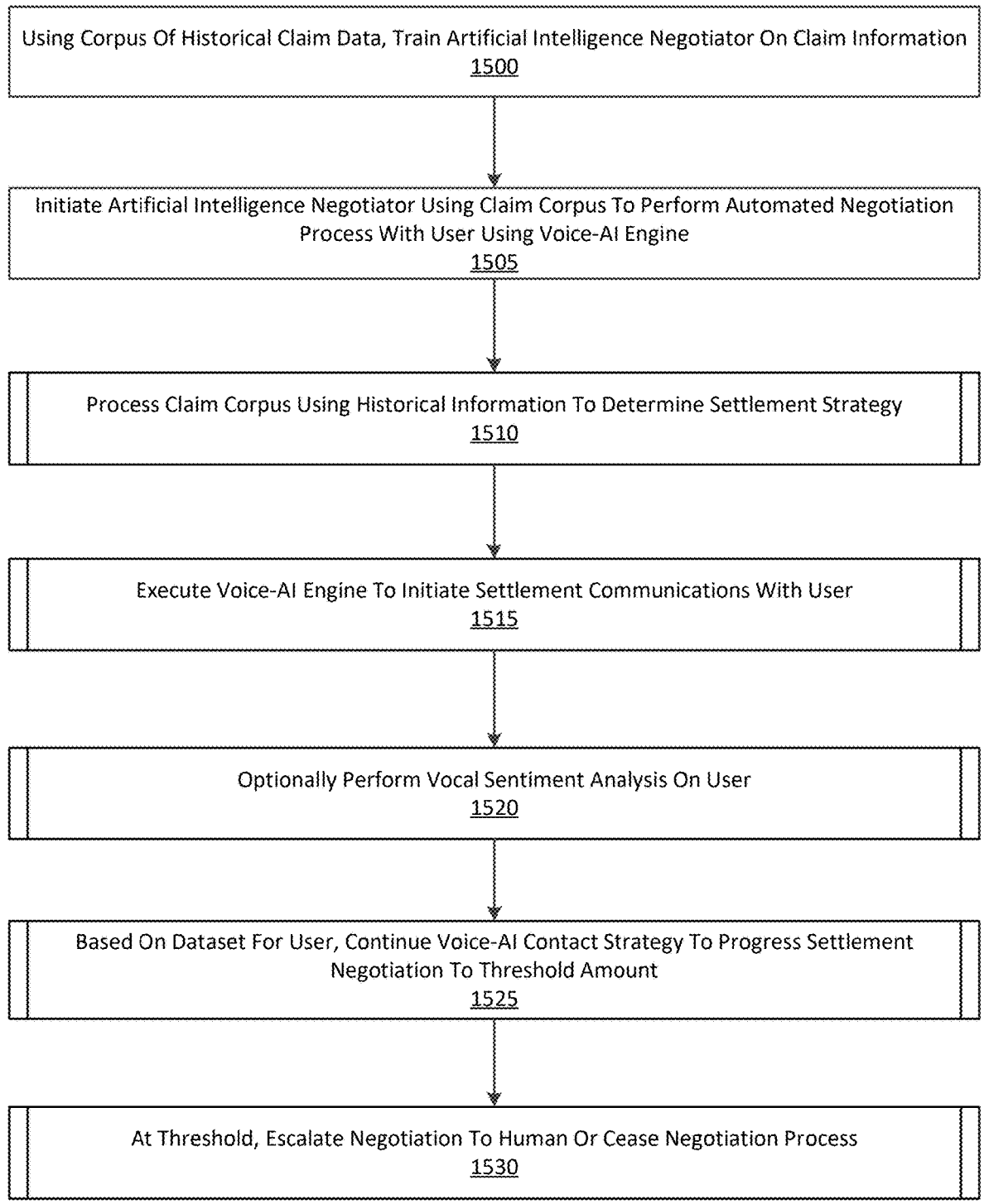
FIG. 15 is a flow chart describing a method of automated voice-AI settlement negotiation, according to examples described herein.

FIG. 15 is a flow chart describing a method of automated voice-AI settlement negotiation, according to examples described herein. In certain examples, the automated settlement negotiation can be performed following injury assistance, or can be performed at the later stages of the claim process when information gathering, automated corroboration, injury inputs, damage inputs, fraud detection, content capture, and/or collision simulations have been completed. Referring to FIG. 15, the computing system 100 can use a corpus of historical claim data to train a predictive machine-learning model on claim information, such as paid damages or settlements for various types of claim events, including various types of vehicle incidents, injuries, and/or property damage (1500). In various implementations, the computing system 100 can initiate an artificial intelligence negotiator using the claim corpus of a user 194 to perform an automated negotiation process using the voice-AI engine 130 (1505).

For example, the computing system 100 can obtain the corpus of information corresponding to a particular claim event or claim file 112. In certain examples, the voice-AI engine 130 can be implemented as an artificial intelligence negotiator, and can determine or calculate one or more settlement offers for the user 194 using user-specific information (e.g., in the claim corpus), which can comprise demographic information, age information, income or net worth information, home location, and the like. As provided herein, the voice-AI engine 130 can process the claim corpus using historical information to determine a settlement negotiation strategy (1510). As further provided herein, the adaptive flow engine 125 and/or voice-AI engine 130 can communicate with the user 194 using optimal communication means and methods based on the engagement data determined for the user 194. Thereafter, the computing system 100 can execute the voice-AI engine 130 to initiate the settlement communications with the user 194 (1515).

In some examples, the voice-AI engine 130 can optionally perform vocal sentiment analysis on the user 194 (1520). For example, the sentiment analysis can be performed to determine whether the user 194 is open to accepting the settlement offer or if the user 194 is likely to reject the settlement offer (e.g., dynamically determining a receptiveness level). For example, when the voice-AI engine 130, implementing an artificial intelligence negotiator, determines that the user's voice and manner during a voice-AI call session indicates receptiveness to a current settlement offer, the voice-AI engine 130 can alter the negotiation strategy (e.g., to maintain the current offer). If the user 194 does not accept an initial offer, the voice-AI engine 130 can progress the settlement negotiation to a threshold amount, which can be determined based on the reserve amount determined at an earlier stage of the claim process, or historical information of similar claims and claim processes (1525). After reaching the threshold, the voice-AI engine 130 can escalate the negotiation process to a human negotiator or can otherwise cease advancing with negotiation process (1530).

It is contemplated that the various combinations of steps described in connection with the flow charts provided herein can automate certain processes previously performed manually by humans, and can further provide significant efficiencies in the multiple stages of the claim filing and information gathering processes that contribute to add-on efficiencies further down the line, such as expediting claim investigation, civil litigation, and/or damage mitigation processes. The methods described throughout the present disclosure may further achieve various practical applications in the field of claim processing, such as reducing costs, inducing user engagement, dynamically adapting content flows, facilitating dynamic scripting voice-AI calling, and the like.

Hardware Diagrams

Figure 16:
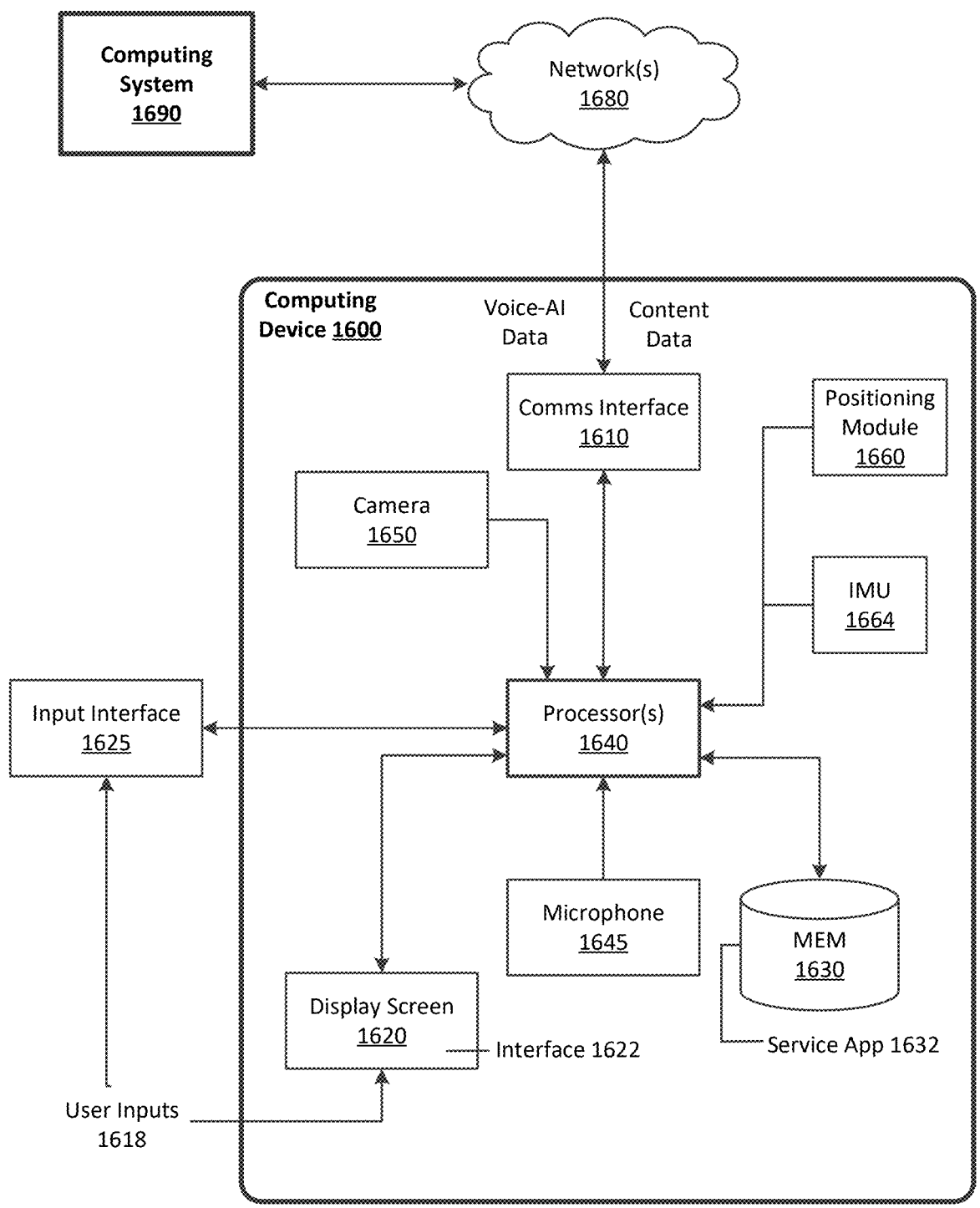
FIG. 16 is a block diagram illustrating an example user computing device, according to examples described herein.

FIG. 16 is a block diagram illustrating an example user computing device, according to examples described herein. In many implementations, the computing device 1600 can comprise a mobile computing device, such as a smartphone, tablet computer, laptop computer, VR or AR headset device, and the like. As such, the computing device 1600 can include telephony features such as a microphone 1645, a camera

1650, and a communication interface 1610 to communicate with external entities using any number of wireless communication protocols. In variations, the computing device 1600 can comprise a personal computer or desktop computer that a user can engage with to access the services implemented by the computing system 100 of FIG. 1, and can include an input interface 1625 that includes, for example, a keyboard and/or mouse to enable a user to provide inputs, such as mouse and typing inputs. The computing device 1600 can further include a positioning module 1660 (e.g., GPS receiver) and an inertial measurement unit 1664 that includes one or more accelerometers, gyroscopes, or magnetometers. In certain aspects, the computing device 1600 can store a designated service application 1632 in a memory 1630 of the computing device 1600. In variations, the memory 1630 can store additional applications executable by one or more processors 1640 of the computing device 1600, enabling access and interaction with one or more host servers over one or more networks 1680.

The computing device 1600 can be operated by a user 194 through execution of the service application 1632, which can enable communications with the computing system 1690 to access the various services described herein. As such, a user can launch the service application 1632 to receive content data that causes a user interface 1622 to be presented on the display screen 1620. The user interface 1622 can present content flows for information gathering, guided content capture, damage IQ interfaces, collision IQ interfaces, injury IQ interfaces, and other adaptive content flows, as described throughout the present disclosure.

As provided herein, the application 1632 can enable a communication link with the computing system 1690 over one or more networks 1680, such as the computing system 100 as shown and described with respect to FIG. 1. The processor 1640 can generate user interface features using content data received from the computing system 1690 over the network 1680. Furthermore, as discussed herein, the application 1632 can enable the computing system 1690 to cause the generated user interface 1622 to be displayed on the display screen 1620 and enable the user to interact with the content flows, as further described herein.

In variations, the user can access one or more interfaces described here through execution of a browser application access to computing system features over the network(s) 1680. In one example, the guided content capture (e.g., during a call session) can be performed through execution of a browser application, such that the user need not download a new application and can enable real-time content verification.

In various examples, the positioning module 1660 can provide location data indicating the current location of the user to the computing system 1690. In further examples, the IMU 1664 can provide IMU data, such as accelerometer data, magnetometer data, and/or gyroscopic data to the computing system 1690 to, for example, enable the computing system 1690 to corroborate contextual information provided in connection with a claim event. In examples described herein, the computing system 1690 can transmit content data and voice-AI data to the communication interface 1610 of the computing device 1600 over the network(s) 1680. The content data can cause the executing service application 1632 to display the user interface 1622 for the executing application 1632.

When a particular content flow is presented on the user interface 1622, the user can provide user inputs 1618 to interact with the content flows (e.g., via the display screen 1620 or input interface 1625). The content flows can correspond to information gathering for a claim process that facilitate processing a claim for a user. Additionally, the computing system 1690 can implement voice-AI technology to make automated calls to the user computing device 1600.

Figure 17:
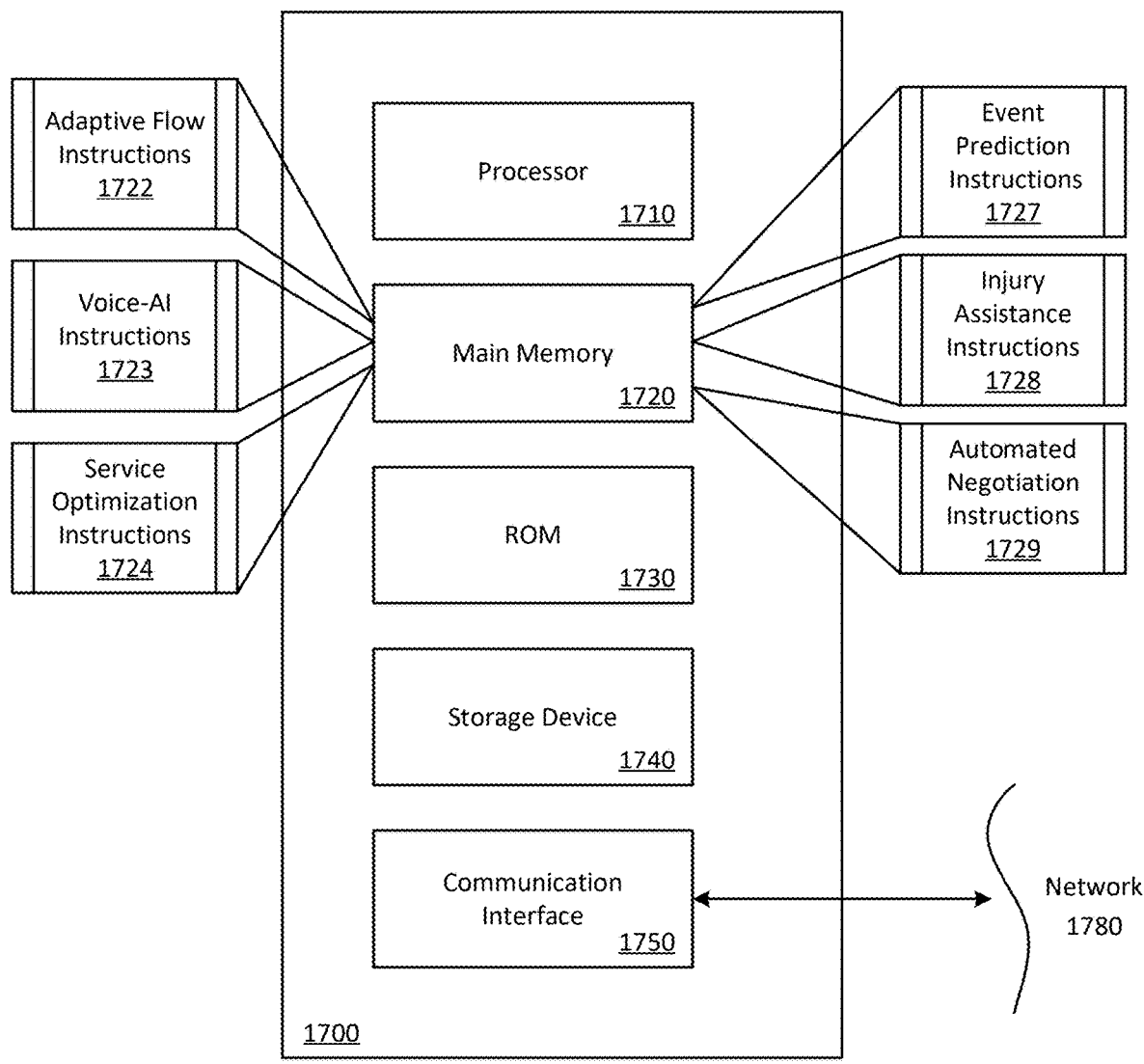
FIG. 17 is a block diagram that illustrates a computer system upon which examples described herein may be implemented.

FIG. 17 is a block diagram that illustrates a computer system 1700 upon which examples described herein may be implemented. A computer system 1700 can be implemented on, for example, a server or combination of servers. For example, the computer system 1700 may be implemented as part of a network service, such as described in connection with FIGS. 1 through 24. In the context of FIG. 1, the computer system 100 may be implemented using a computer system 1700 described in connection with FIG. 17. The computing system 100 may also be implemented using a combination of multiple computer systems as described in connection with FIG. 17.

In one implementation, the computer system 1700 includes processing resources 1710, a main memory 1720, a read-only memory (ROM) 1730, a storage device 1740, and a communication interface 1750. The computer system 1700 includes at least one processor 1710 for processing information stored in the main memory 1720, such as provided by a random-access memory (RAM) or other dynamic storage device that stores information and instructions which are executable by the processor 1710. The main memory 1720 also may be used for storing temporary variables or other intermediate information during execution of instructions to be executed by the processor 1710. The computer system 1700 may also include the ROM 1730 or other static storage device for storing static information and instructions for the processor 1710. A storage device 1740, such as a magnetic disk or optical disk, is provided for storing information and instructions.

The communication interface 1750 enables the computer system 1700 to communicate via one or more networks 1780 (e.g., cellular network) through use of the network link (wireless or wired). Using the network link, the computer system 1700 can communicate with one or more computing devices, one or more servers, and/or one or more databases. In accordance with examples described throughout the present disclosure, the computer system 1700 stores executable instructions stored in the memory 1730, which can include various instructions including adaptive flow instructions 1722, voice-AI instructions 1723, service optimization instructions 1724, event prediction instructions 1727, injury assistance instructions 1728, and automated negotiation instructions 1729.

By way of example, the instructions and data stored in the memory 1720 can be executed by the processor 1710 to implement the functions of an example computing system 100 of FIG. 1. In various examples, the processor 1710 can execute the adaptive flow instructions 1722 to perform an individualized claim process for a user 194. In further examples, the processors 1710 can execute the voice-AI instructions 1723 to make automated voice-AI calls to users 194, as described herein. In further examples, the processors 1710 can execute the automated negotiator instructions 1729 to perform automated settlement negotiation with a user, or can link with an artificial intelligence engine (e.g., over network 1780) to facilitate negotiations with the user.

In various examples, the processors 1710 can further execute the injury assistance instructions 1728 to provide injured users with individualized claim hub features and voice-based recovery assistance. The processors 1710 can further execute the event prediction instructions 1727 to predict which users are likely to be affected by an event, and provide voice-AI warnings to those users, as described herein. In further examples, the processors 1710 can execute the service optimization instructions 1724 to create customized service provider rankings based on various parameters pertaining to the claim file and/or user-specific information.

Examples described herein are related to the use of the computer system 1700 for implementing the techniques described herein. According to one example, the techniques are performed by the computer system 1700 in response to the processor 1710 executing one or more sequences of one or more instructions contained in the main memory 1720. Such instructions may be read into the main memory 1720 from another machine-readable medium, such as the storage device 1740. Execution of the sequences of instructions contained in the main memory 1720 causes the processor 1710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
   a network communication interface;
   one or more processors; and
   a memory storing instructions that, when executed by the one or more processors, cause the computing system to:
   receive predictive data corresponding to a predicted event;
   identify users predicted to be affected by the predicted event by performing a lookup of policy information of each respective user to identify a location of a property of the respective user, the policy information for each respective user providing a set of unique property characteristics of the respective user's property;
   initiate a voice-AI engine to perform a voice-AI call to each of the users, the voice-AI call providing a warning to each of the users;
   using the predictive data, generate a severity heat map for the predicted event, wherein the users predicted to be affected by the predicted event comprise users that have property within the severity heat map;
   wherein the warning provided to each respective user is generated by the voice-AI engine based on the location of the respective user's property within the severity heat map;
   generate a set of mitigative tasks for the respective user to mitigate damage or loss to the respective user's property arising from the predicted event; and
   provide the set of mitigative tasks to the respective user.

2. The computing system of claim 1, wherein the executed instructions cause the computing system to provide the set of mitigative tasks to the respective user during the voice-AI call.

3. The computing system of claim 1, wherein the executed instructions cause the computing system to provide the set of mitigative tasks to the respective user via a user interface during an application session.

4. The computing system of claim 1, wherein the predicted event comprises one of a predicted catastrophic weather event or a predicted natural disaster.

5. A non-transitory computer readable medium storing instructions that, when executed by one or more processors of a computing system, cause the computing system to:
   receive predictive data corresponding to a predicted event;
   identify users predicted to be affected by the predicted event by performing a lookup of policy information of each respective user to identify a location of a property of the respective user, the policy information for each respective user providing a set of unique property characteristics of the respective user's property;
   initiate a voice-AI engine to perform a voice-AI call to each of the users, the voice-AI call providing a warning to each of the users; and
   using the predictive data, generate a severity heat map for the predicted event, wherein the users predicted to be affected by the predicted event comprise users that have property within the severity heat map;
   wherein the warning provided to each respective user is generated by the voice-AI engine based on the location of the respective user's property within the severity heat map;
   generate a set of mitigative tasks for the respective user to mitigate damage or loss to the respective user's property arising from the predicted event; and
   provide the set of mitigative tasks to the respective user.

6. The non-transitory computer readable medium of claim 5, wherein the executed instructions cause the computing system to provide the set of mitigative tasks to the respective user during the voice-AI call.

7. The non-transitory computer readable medium of claim 5, wherein the executed instructions cause the computing system to provide the set of mitigative tasks to the respective user via a user interface during an application session.

8. The non-transitory computer readable medium of claim 5, wherein the predicted event comprises one of a predicted catastrophic weather event or a predicted natural disaster.

9. A computer-implemented method performed by one or more processors, comprising:
   receiving predictive data corresponding to a predicted event;
   identifying users predicted to be affected by the predicted event by performing a lookup of policy information of each respective user to identify a location of a property of the respective user, the policy information for each respective user providing a set of unique property characteristics of the respective user's property;
   initiating a voice-AI engine to perform a voice-AI call to each of the users, the voice-AI call providing a warning to each of the users;
   using the predictive data, generating a severity heat map for the predicted event, wherein the users predicted to be affected by the predicted event comprise users that have property within the severity heat map;
wherein the warning provided to each respective user is generated by the voice-AI engine based on the location of the respective user's property within the severity heat map;
generating a set of mitigative tasks for the respective user to mitigate damage or loss to the respective user's property arising from the predicted event; and
providing the set of mitigative tasks to the respective user.

* * * * *